United States Patent
Izumi et al.

(10) Patent No.: US 11,649,327 B2
(45) Date of Patent: May 16, 2023

(54) PHOTOCHROMIC CURABLE COMPOSITION, USE THEREOF, AND POLYROTAXANE MONOMERS

(71) Applicant: Tokuyama Corporation, Shunan (JP)

(72) Inventors: Shinobu Izumi, Shunan (JP); Ayako Ohara, Shunan (JP); Yasutomo Shimizu, Shunan (JP); Junji Momoda, Shunan (JP)

(73) Assignee: Tokuyama Corporation, Shunan (JP)

( * ) Notice: Subject to any disclaimer, the term of this patent is extended or adjusted under 35 U.S.C. 154(b) by 0 days.

(21) Appl. No.: 16/322,177

(22) PCT Filed: Aug. 3, 2017

(86) PCT No.: PCT/JP2017/028189
§ 371 (c)(1),
(2) Date: Jan. 31, 2019

(87) PCT Pub. No.: WO2018/030257
PCT Pub. Date: Feb. 15, 2018

(65) Prior Publication Data
US 2019/0161585 A1 May 30, 2019

(30) Foreign Application Priority Data
Aug. 10, 2016 (JP) .............. JP2016-157960

(51) Int. Cl.
| | |
|---|---|
| C08G 83/00 | (2006.01) |
| C09K 9/02 | (2006.01) |
| C08F 290/14 | (2006.01) |
| G02B 5/23 | (2006.01) |
| G02B 1/04 | (2006.01) |
| C08L 5/16 | (2006.01) |
| C08L 33/10 | (2006.01) |
| G02B 1/00 | (2006.01) |

(52) U.S. Cl.
CPC .......... *C08G 83/007* (2013.01); *C08F 290/14* (2013.01); *C08L 5/16* (2013.01); *C08L 33/10* (2013.01); *C09K 9/02* (2013.01); *G02B 1/04* (2013.01); *G02B 5/23* (2013.01); *G02B 1/005* (2013.01)

(58) Field of Classification Search
CPC .. C08G 83/007; C08G 290/14; C08G 222/10; C08G 222/102; G02B 5/23; G02B 1/04; G02B 1/005; C08L 5/16; C08L 33/10; C09K 9/02
See application file for complete search history.

(56) References Cited

U.S. PATENT DOCUMENTS

| | | |
|---|---|---|
| 8,066,917 B2 | 11/2011 | Nagoh et al. |
| 8,343,628 B2 | 1/2013 | Fukuda et al. |
| 8,497,320 B2 | 7/2013 | Ruslim et al. |
| 8,663,508 B2 | 3/2014 | Takenaka et al. |
| 8,927,098 B2 | 1/2015 | Jung et al. |
| 9,316,765 B2 | 4/2016 | Mori et al. |
| 9,482,787 B2 | 11/2016 | Kawato et al. |
| 9,884,969 B2 | 2/2018 | Kim et al. |
| 9,977,161 B2 | 5/2018 | Momoda et al. |
| 10,125,309 B2 | 11/2018 | Shimizu et al. |
| 10,253,140 B2 | 4/2019 | Masuhara et al. |
| 2009/0214871 A1* | 8/2009 | Fukuda .................. C08B 33/00 428/413 |
| 2009/0305002 A1* | 12/2009 | Su .......................... C09K 9/02 428/174 |
| 2011/0105688 A1 | 5/2011 | Ruslim et al. |
| 2014/0079937 A1 | 3/2014 | Jung et al. |
| 2014/0080936 A1 | 3/2014 | Kim et al. |
| 2015/0361209 A1* | 12/2015 | Masuhara ............ C08F 283/006 525/54.31 |
| 2016/0222285 A1* | 8/2016 | Shimizu .................. G02B 5/23 |
| 2016/0229963 A1 | 8/2016 | Masuhara et al. |

FOREIGN PATENT DOCUMENTS

| | | |
|---|---|---|
| CN | 102781986 A | 11/2012 |
| CN | 104125965 A | 10/2014 |
| CN | 105636989 A | 6/2016 |
| JP | 2008310286 A | 12/2008 |
| JP | 2009204725 A | 9/2009 |
| JP | 2014224270 A | 12/2014 |
| KR | 1020110011611 A | 2/2011 |
| WO | 2003/011967 A1 | 2/2003 |
| WO | 2009/075388 A1 | 6/2009 |
| WO | 2011/125956 A1 | 10/2011 |
| WO | 2012/176439 A1 | 12/2012 |
| WO | 2013/099640 A1 | 7/2013 |
| WO | 2015/068798 A1 | 5/2015 |

\* cited by examiner

*Primary Examiner* — Robert S Jones, Jr.
(74) *Attorney, Agent, or Firm* — The Webb Law Firm

(57) ABSTRACT

Provided is a photochromic curable composition which forms a cured body that develops excellent photochromic properties. The photochromic curable composition (A) includes: a polyrotaxane monomer wherein, in a polyrotaxane compound having a composite molecular structure composed of an axial molecule and a plurality of cyclic molecules threaded onto the axial molecule, and side chains having OH groups introduced into the cyclic molecules, 1 mol % or more to less than 100 mol % of OH groups in the side chains are modified with a compound having a radical-polymerizable group, (B) a photochromic compound, and (C) a polymerizable monomer other than the (A) polyrotaxane monomer.

10 Claims, 1 Drawing Sheet

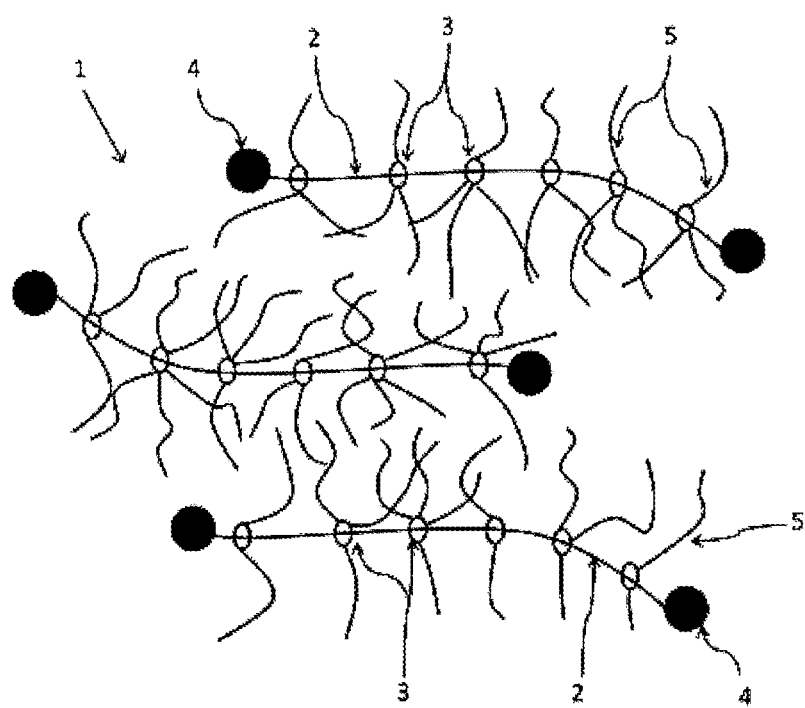

PHOTOCHROMIC CURABLE COMPOSITION, USE THEREOF, AND POLYROTAXANE MONOMERS

CROSS-REFERENCE TO RELATED APPLICATIONS

This application is the United States national phase of International Application No. PCT/JP2017/028189 filed Aug. 3, 2017, and claims priority to Japanese Patent Application No. 2016-157960 filed Aug. 10, 2016, the disclosures of which are hereby incorporated by reference in their entirety.

TECHNICAL FIELD

The present invention relates to a photochromic curable composition, use thereof, and polyrotaxane monomers.

BACKGROUND ART

Photochromic compounds typified by chromene compounds, fulgide compounds and spirooxazine compounds have properties (photochromic properties) in which their colors immediately change under the irradiation of light containing ultraviolet light such as sunlight or light from a mercury lamp and return to their original colors when the irradiation is stopped and the compounds are put in the dark. By making use of these properties, the photochromic compounds are used for various applications, especially optical materials.

For example, a photochromic spectacle lens to which photochromic properties are imparted by using a photochromic compound immediately takes on a color and serves as sunglasses outdoors where light containing ultraviolet light such as sunlight is radiated, while the lens is faded and serves as ordinary eyeglasses indoors where such light is not radiated. Demand for photochromic spectacle lenses has been growing recently.

To provide photochromic properties to optical materials, a photochromic compound is generally used in combination with a plastic material. Specifically, the following means are known.

(a) A method in which a photochromic compound is dissolved in a polymerizable monomer and the obtained solution is polymerized to directly mold an optical material such as a lens. This method is called the kneading method.

(b) A method in which a resin layer in which a photochromic compound is dispersed is formed on a surface of a plastic molding such as a lens by coating or cast-polymerization. This method is called the lamination method.

(c) A method in which two optical sheets are bonded together by means of an adhesive layer formed of an adhesive resin in which a photochromic compound is dispersed. This method is called the binder method.

Optical materials of optical articles to which photochromic properties are imparted further require the following properties:

(I) a low degree of coloration in a visible light region before ultraviolet light irradiation (i.e., initial coloration),
(II) a high degree of coloration under ultraviolet light irradiation (i.e., color optical density),
(III) a high speed from the stoppage of the irradiation of ultraviolet light until the material returns to its original state (i.e., fading speed),
(IV) high repeat durability of a reversible function between color development and fading,
(V) high storage stability,
(VI) easy molding into various shapes, and
(VII) photochromic properties imparted without mechanical strength reduction Accordingly, various proposals to satisfy the above requirements have been made for the production of optical materials having photochromic properties by the above methods (a), (b) and (c).

For example, the above kneading method has an advantage in which photochromic plastic lenses can be mass-produced at a low cost by using glass molds, and the majority of photochromic plastic lenses are currently produced by this method (cf. Patent Document 1 and Patent Document 2).

However, since strength is required for a lens substrate in the conventional kneading method, the mechanical strength of a matrix resin in which a photochromic compound is dispersed needs to be increased. As a result, excellent photochromic properties are difficult to develop. Namely, since the degree of freedom of molecules contained in the photochromic compound present in the matrix resin is reduced, a photochromic reversible reaction is impaired.

With respect to the kneading method as such, Patent Document 1 describes a technique of adding a photochromic compound to a monomer composition comprising an isocyanate monomer and a thiol monomer, for example. Patent Document 2 describes a photochromic curable composition comprising a specific polymerizable (meth)acrylic monomer and a photochromic compound.

However, photochromic lenses molded by the polymerization-curing of these compositions still have room for improvement in terms of photochromic properties, particularly fading speed, though they have high mechanical strength.

On the other hand, compared with the above-described kneading method, photochromic properties in the lamination method or binder method are developed in a thin layer formed on a surface of various substrates (cf. Patent Document 3, Patent Document 4 and Patent Document 5, for example). For this reason, a photochromic compound needs to be dissolved in a high concentration to develop the same color optical density as that obtained by the kneading method. In this case, however, problems such as insufficient solubility and precipitation during storage are caused depending on the type of the photochromic compound. Furthermore, since the layer in which photochromic properties are developed is thin, the photochromic compound may be inferior in durability.

For example, Patent Document 3 discloses that a photochromic curable composition is applied onto a plastic lens by spin-coating or the like and is optically cured to form a photochromic coating layer (this lamination method is also called the "coating method"). In addition, Patent Document 4 discloses a method for forming a photochromic layer in which a space is provided between a plastic lens and a glass mold by use of members such as an elastomer gasket, an adhesive tape or a spacer, and a photochromic curable composition is poured into the space and is polymerization-cured (this method hereinafter also called the "two-stage polymerization method"). Further, Patent Document 5 discloses that a laminated sheet is produced by bonding transparent carbonate sheets to each other by means of a polyurethane resin adhesive layer containing a photochromic compound (binder method).

However, since photochromic properties are developed by means of a thin layer containing a photochromic compound in all of Patent Documents 3 to 5, color optical density tends to be low when a photochromic compound having low solubility is used, and the photochromic compound still has room for improvement in terms of durability.

As in the foregoing, known technologies have room for improvement in photochromic properties such as color optical density and fading speed. Namely, the development of better photochromic properties such as color optical density and fading speed has been required recently under the current circumstances.

In the above status, the present inventors proposed a photochromic curable composition containing a polyrotaxane compound (cf. Patent Document 6). A polyrotaxane compound is a compound having a composite molecular structure composed of an axial molecule and a plurality of cyclic molecules threaded onto the axial molecule. Patent Document 6 shows a cured body having excellent mechanical properties, moldability, color optical density, and fading speed obtained by the addition of a polyrotaxane compound.

CITATION LIST

Patent Literature

Patent Document 1: WO 2012/176439
Patent Document 2: WO 2009/075388
Patent Document 3: WO 2011/125956
Patent Document 4: WO 2003/011967
Patent Document 5: WO 2013/099640
Patent Document 6: WO 2015/068798

SUMMARY OF INVENTION

Technical Problem

According to Patent Document 6, excellent photochromic curable compositions and cured bodies thereof can be obtained by adding a polyrotaxane compound, but the examination by the present inventors revealed the possibility of improvement on the following points. When photochromic curable compositions using the polyrotaxane compounds specifically disclosed in the examples of Patent Document 6 were used, some of the obtained cured bodies had cracks, distortions, and the like, which were assumed to require further improvement. This tendency was especially notable when a photochromic laminate was produced by a coating method.

Accordingly, an object of the present invention is to provide a cured body with excellent quality having photochromic properties superior in both color optical density and fading speed and a photochromic curable composition capable of increasing the yield of the cured body, particularly, to provide a photochromic composition for coating which allows the obtained film (a film formed of the cured body) to have excellent properties.

Another object of the present invention is to provide a polyrotaxane monomer having high solubility in various solvents and monomers.

Solution to Problem

The inventors of the present invention dedicated themselves to studies to solve the above problems. First, they addressed the structure of the polyrotaxane compounds used in Patent Document 6 and examined it from many aspects. Then, they supposed that in the polyrotaxane compounds specifically disclosed in the examples of Patent Document 6, all the OH groups (hydroxyl groups), namely 100 mol % of the OH groups, in the side chains terminated with an OH group are modified with radical-polymerizable groups, and the molecular structure as such may affect the yield. In other words, the inventors supposed that, due to many radical-polymerizable groups contained in the polyrotaxane compounds used, polymerization locally proceeds during the curing of a curable composition even when the compound is added in a small amount, resulting in molding defects (cracks and distortions) in the obtained cured bodies. On the basis of the above supposition, the inventors further performed intensive studies and found that the problems can be resolved by combining a photochromic compound with a polyrotaxane monomer having a specific composition. The present invention was completed based on the above finding.

(1) According to the present invention,
a photochromic curable composition is provided which comprises (A) a polyrotaxane monomer in which, in a polyrotaxane compound having a composite molecular structure composed of an axial molecule and a plurality of cyclic molecules threaded onto the axial molecule, and side chains having OH groups introduced into the cyclic molecules, 1 mol % or more to less than 100 mol % of the OH groups in the side chains are modified with a compound having a radical-polymerizable group;
(B) a photochromic compound; and
(C) a polymerizable monomer other than the (A) polyrotaxane monomer.

In the present invention, the ratio of modification is a ratio indicating a mol % of OH groups converted into a structure derived from another compound in relation to the total OH groups in the side chains contained in the polyrotaxane compound. Namely, the ratio of modification with a compound having a radical-polymerizable group is a value calculated by dividing the number of moles of the structure derived from the compound having a radical-polymerizable group introduced by the modification by the number of moles of all the OH groups in the side chains before the modification (i.e., the number of moles of OH groups in the side chains contained in the polyrotaxane compound) and then multiplying the obtained value by 100 (It can be calculated based on the equation: the ratio of modification with the compound having a radical-polymerizable group= (the number of moles of the structure derived from the compound having a radical-polymerizable group introduced)/(the number of moles of all the OH groups in the side chains before the modification)×100).). The ratio of modification with a compound not containing a radical-polymerizable group is a value calculated by dividing the number of moles of the structure derived from the compound not containing a radical-polymerizable group introduced by the modification by the number of moles of all the OH groups in the side chains before the modification (i.e., the number of moles of OH groups in side chains contained in the polyrotaxane compound) and then multiplying the obtained value by 100 (It can be calculated based on the equation: ratio of modification with a compound not containing a radical-polymerizable group=(the number of moles of the structure derived from the compound not containing a radical-polymerizable group introduced)/(the number of moles of all the OH groups in the side chains before the modification)×100.).

In the present invention, the above polyrotaxane monomer is a molecule complex having a structure in which a chain axial molecule is threaded through the rings of a plurality of cyclic molecules and a bulky group is bonded to both ends of the axial molecule so that the cyclic molecules are not dethreaded from the axial molecule due to steric hindrance. The molecule complex such as polyrotaxane is called supramolecule.

The photochromic curable composition of the present invention can take the following preferred embodiments.

(2) In the (A) polyrotaxane monomer, the radical-polymerizable group is a (meth)acrylate group.

(3) In the (A) polyrotaxane monomer, the cyclic molecules are cyclodextrin rings.

(4) In the (A) polyrotaxane monomer, the axial molecule threaded through the rings of the cyclic molecules has a chain structure having a bulky group at both ends, the chain structure moiety is formed of polyethylene glycol and the bulky group at both ends is an adamantyl group.

(5) A side chain having an OH group in the polyrotaxane compound is derived from a lactone-based compound.

(6) When the total amount of the (A) polyrotaxane monomer and the (C) polymerizable monomer other than the (A) polyrotaxane monomer is regarded as 100 parts by mass, the (B) photochromic compound is contained in an amount of 0.0001 to 10 parts by mass.

(7) When the total amount of the (A) polyrotaxane monomer and the (C) polymerizable monomer other than the (A) polyrotaxane monomer is regarded as 100 parts by mass, the (A) polyrotaxane monomer is contained in an amount of 0.1 to 50 parts by mass.

(8) When the total of the (C) polymerizable monomer other than the (A) polyrotaxane monomer is regarded as 100% by mass, (C1) a bifunctional (meth)acrylate monomer having two (meth)acrylate groups in its molecule is 30 to 80% by mass, (C2) a polyfunctional (meth)acrylate monomer having three or more (meth)acrylate groups in its molecule is 10 to 50% by mass, and (C3) a monofunctional (meth)acrylate monomer having a single (meth)acrylate group is 0 to 20% by mass.

(9) In the (A) polyrotaxane monomer, on the basis of 100 mol % of OH groups in the side chains contained in the polyrotaxane compound, the ratio of modification with the compound having a radical-polymerizable group is more than 70 mol % to 95 mol % or less, the ratio of modification with a compound not containing a radical-polymerizable group is 0 mol % or more to less than 30 mol %, and the ratio of unmodified OH groups is 0 mol % or more to less than 30 mol %.

(10) In the (A) polyrotaxane monomer, on the basis of 100 mol % of OH groups in the side chains contained in the polyrotaxane compound, the ratio of modification with the compound having a radical-polymerizable group is 1 mol % or more to less than 40 mol %, the ratio of modification with a compound not containing a radical-polymerizable group is more than 0 mol % to 65 mol % or less, and the ratio of unmodified OH groups is 0 mol % or more to 60 mol % or less.

(11) A cured body obtained by curing the photochromic curable composition.

(12) A photochromic laminate in which the cured body is laminated on an optical substrate.

Another aspect of the present invention is to provide a polyrotaxane monomer in which, in a polyrotaxane compound having a composite molecular structure composed of an axial molecule and a plurality of cyclic molecules threaded onto the axial molecule, and side chains having OH groups introduced into the cyclic molecules, OH groups in the side chains are modified, and in which 1 mol % or more to less than 100 mol % of OH groups in the side chains are modified with a compound having a radical-polymerizable group, more than 0 mol % to 99 mol % or less of OH groups in the side chains are modified with a compound not containing a radical-polymerizable group, and the remaining ratio of OH groups in the side chains is 0 mol % or more to 60 mol % or less.

The total of the ratio of OH groups in the side chains, modified with a compound having a radical-polymerizable group, the ratio of OH groups in the side chains, modified with a compound not containing a radical-polymerizable group, and the remaining ratio of OH groups in the side chains is 100 mol %. The compound not containing a radical-polymerizable group is preferably a compound having neither a radical-polymerizable group nor a hydroxyl group (OH).

Advantageous Effects of Invention

By using the photochromic curable composition according to the present invention, a cured body developing photochromic properties including excellent color-development properties and fading speed can be obtained as demonstrated in the examples described later.

The development of the above photochromic properties is ascribed to the use of the polyrotaxane monomer in combination with a photochromic compound, and the present inventors consider the reason as follows. Namely, since the cyclic molecules contained in a polyrotaxane can slide over the axial molecule, a space is formed around the cyclic molecules. The space allows the reversible structural change of the photochromic compound to occur immediately, by which improved fading speed and color optical density are brought about. Moreover, the reversible structural change of the photochromic compound that is present in the vicinity of the highly flexible side chains occurs more immediately by the introduction of the cyclic molecules into which side chains are introduced.

Accordingly, when polymerizable monomers and the like are mixed with the photochromic composition and the mixture is polymerization-cured to form a cured body, a space which does not disturb the reversible structural change of the photochromic compound is formed by the sliding cyclic molecules mentioned above and thereby fading speed and color optical density will be improved. As can be understood from the above, the photochromic composition of the present invention excels in fading speed and ensures sufficient color optical density.

In addition, the reason why a high quality cured body can be obtained in a high yield by the photochromic curable composition of the present invention can be supposed as follows. Namely, the polyrotaxane monomer used in the present invention is obtained by modifying OH groups in the side chains contained in the polyrotaxane compound with a radical-polymerizable group, and the ratio of the modification is adjusted. As a result, local polymerization can be suppressed and thereby a cured body having reduced distortions and cracks can be obtained. The effects are remarkable during the preparation of a photochromic laminate in which the cured body is laminated on an optical substrate. It can be supposed that local polymerization barely occurs by adjusting the ratio of modification with radical-polymerizable groups, and thereby cured bodies having distortions and cracks due to the polymerization shrinkage of the photochromic curable composition and the like can be reduced.

Further, the polyrotaxane monomer according to the present invention is a polyrotaxane monomer in which, in a polyrotaxane compound having OH groups in side chains, OH groups in the side chains are modified, and
in which
1 mol % or more to less than 100 mol % of OH groups in the side chains are modified with a compound having a radical-polymerizable group,
more than 0 mol % to 99 mol % or less of OH groups in the side chains are modified with a compound not containing a radical-polymerizable group, and
the remaining ratio of OH groups in the side chains is 0 mol % or more to 60 mol % or less. Namely, the ratio of OH groups in the side chains is adjusted to the specific ratio and thereby excellent polymerizability and high compatibility with commonly used polymerizable monomers can be achieved.

BRIEF DESCRIPTION OF THE DRAWING

The drawing is a schematic view showing a molecular structure of a polyrotaxane used in the present invention.

DESCRIPTION OF EMBODIMENTS OF THE INVENTION

The photochromic curable composition according to the present invention is a photochromic curable composition comprising
(A) a polyrotaxane monomer wherein, in a polyrotaxane compound having a composite molecular structure composed of an axial molecule and a plurality of cyclic molecules threaded onto the axial molecule, and side chains having OH groups introduced into the cyclic molecules, 1 mol % or more to less than 100 mol % of the OH groups in the side chains are modified with a compound having a radical-polymerizable group;
(B) a photochromic compound; and
(C) a polymerizable monomer other than the (A) polyrotaxane monomer. Each of the components is described.
(A) Polyrotaxane Monomer
In the present invention, (A) a polyrotaxane monomer is used in which, in a polyrotaxane compound having a composite molecular structure composed of an axial molecule and a plurality of cyclic molecules threaded onto the axial molecule, and side chains having OH groups introduced into the cyclic molecules, 1 mol % or more to less than 100 mol % of the OH groups in the side chains are modified with a compound having a radical-polymerizable group (this monomer may hereinafter be simply called "(A) polyrotaxane monomer" or "(A) component").
A polyrotaxane is a known compound. As shown in FIG. 1, the entirety of a polyrotaxane molecule represented by "1" has a composite molecular structure composed of a chain axial molecule "2" and cyclic molecules "3". Namely, a plurality of the cyclic molecules "3" are threaded onto the chain axial molecule "2", and the axial molecule "2" is threaded through the inside of the rings of the cyclic molecules "3". Therefore, the cyclic molecules "3" can freely slide over the axial molecule "2", and a bulky end group "4" is formed in both ends of the axial molecule "2" to prevent the cyclic molecules "3" from dethreading from the axial molecule "2".
As previously described, since the cyclic molecules "3" can slide over the axial molecule "2", a space is provided which can allow for the reversible reaction of the photochromic compound, and thereby high color optical density and high fading speed can be obtained.
With respect to the (A) polyrotaxane monomer used in the present invention, various axial molecules are known, and the chain structure moiety of the axial molecule may be linear or branched as long as the axial molecule can be threaded through the rings of the cyclic molecules, and is generally formed of a polymer, for example.
Examples of the polymer forming the chain structure moiety of the axial molecule include polyvinyl alcohol, polyvinyl pyrrolidone, cellulose-based resins (such as carboxymethyl cellulose, hydroxyethyl cellulose and hydroxypropyl cellulose), polyacrylamide, polyethylene oxide, polyethylene glycol, polypropylene glycol, polyvinyl acetal, polyvinyl methyl ether, polyamine, polyethylene imine, casein, gelatin, starch, olefin-based resins (such as polyethylene and polypropylene), polyester, polyvinyl chloride, styrene-based resins (such as polystyrene and acrylonitrile-styrene copolymer resin), acrylic resins (such as poly(meth) acrylic acid, polymethyl methacrylate, polymethyl acrylate and acrylonitrile-methyl acrylate copolymer resin), polycarbonate, polyurethane, vinyl chloride-vinyl acetate copolymer resin, polyvinyl butyral, polyisobutylene, polytetrahydrofuran, polyaniline, acrylonitrile-butadiene-styrene copolymer (ABS resin), polyamides (such as nylon), polyimide, polydienes (such as polyisoprene and polybutadiene), polysiloxanes (such as polydimethylsiloxane), polysulfone, polyimine, polyacetic anhydride, polyurea, polysulfide, polyphosphazene, polyketone polyphenylene and polyhalo olefins. These polymers may be copolymerized or modified if appropriate.
A preferable polymer forming the chain structure moiety in the (A) polyrotaxane monomer used in the present invention is polyethylene glycol, polyisoprene, polyisobutylene, polybutadiene, polypropylene glycol, polytetrahydrofuran, polydimethylsiloxane, polyethylene, polypropylene, polyvinyl alcohol, or polyvinyl methyl ether, and polyethylene glycol is the most preferable.
In addition, the bulky group formed in both ends of the chain moiety is not particularly limited as long as it prevents the cyclic molecules from dethreading from the axial molecule, and from the viewpoint of bulkiness, an adamantyl group, a trityl group, a fluoresceinyl group, a dinitrophenyl group, and a pyrenyl group can be mentioned. Particularly in terms of the ease of introduction, an adamantyl group can be mentioned.
The molecular weight of the above axial molecule is not particularly limited. However, when it is too high, compatibility with the other components such as other polymerizable monomers tends to deteriorate, and when it is too low, the slidability of the cyclic molecules is reduced and thereby photochromic properties tend to be lowered. From this viewpoint, the weight average molecular weight Mw of the axial molecule is 1,000 to 100,000, particularly 5,000 to 80,000, and particularly preferably 8,000 to 30,000. The weight average molecular weight Mw was measured by means of the GPC measurement method described in the examples below.
The cyclic molecules are acceptable as long as each of them has a ring as large as it can be threaded onto the above-mentioned axial molecule. Examples of such rings include a cyclodextrin ring, a crown ether ring, a benzo-crown ring, a dibenzo-crown ring, and a dicyclohexano-crown ring, and a cyclodextrin ring is particularly preferable.
Cyclodextrin rings are available in an α-form (ring inner diameter: 0.45 to 0.6 nm), a β-form (ring inner diameter: 0.6 to 0.8 nm) or a γ-form (ring inner diameter: 0.8 to 0.95 nm). In the present invention, α- and γ-cyclodextrin rings are particularly preferable, and an α-cyclodextrin ring is the most preferable.

A plurality of cyclic molecules having the above-mentioned rings are threaded onto one axial molecule. In general, when the maximum number of cyclic molecules threadable onto one axial molecule is assumed as 1, the number of threaded cyclic molecules is preferably 0.001 or more to 0.6 or less, more preferably 0.002 or more to 0.5 or less, and still more preferably 0.003 or more to 0.4 or less. When the number of threaded cyclic molecules is too large, the cyclic molecules will be densely present on one axial molecule, thereby their slidability reduces, and accordingly photochromic properties tend to deteriorate. When the number of threaded cyclic molecules is too small, the space between axial molecules becomes narrow, thereby the spaces which allow for the reversible reaction of the photochromic compound molecules decrease, and accordingly photochromic properties tend to deteriorate as well.

The maximum number of cyclic molecules threadable onto one axial molecule can be calculated from the length of the axial molecule and the thickness of the ring of each cyclic molecule.

For example, when the chain moiety of the axial molecule is composed of polyethylene glycol and the cyclic molecule is an α-cyclodextrin ring, the maximum number of threadable cyclic molecules is calculated as follows.

Two of the repeating unit [—CH$_2$—CH$_2$O-] of polyethylene glycol approximate the thickness of one α-cyclodextrin ring. Thus, the number of the repeating unit is calculated from the molecular weight of the polyethylene glycol, and ½ of the thus-calculated repeating unit number is obtained as the maximum number of threadable cyclic molecules. By regarding the maximum number of threadable cyclic molecules as 1.0, the number of threaded cyclic molecules is adjusted to the range specified above.

In order to obtain the (A) polyrotaxane monomer used in the present invention, a polyrotaxane compound in which side chains having OH groups (hydroxyl groups) are introduced into the above cyclic molecules (this compound may hereinafter be simply called "polyrotaxane compound") is prepared. The side chain is represented by "5" in FIG. 1.

Namely, by introducing the side chain "5" into the ring, an appropriate space can be surely formed between adjacent axial molecules. Thereby a space which allows for the reversible reaction of the photochromic compound molecule can be surely provided and excellent photochromic properties can be developed. The side chain "5" forms a pseudo-crosslinked structure in the (A) polyrotaxane monomer, which improves the mechanical strength of a photochromic cured body formed with the use of the photochromic curable composition of the present invention.

The above side chains are not particularly limited and are preferably formed by the repetition of an organic chain having an OH group and a carbon number in a range of 3 to 20. The average molecular weight of the side chain is 300 to 10,000, preferably 350 to 8,000, more preferably 350 to 5,000, and most preferably 400 to 1,500. The average molecular weight of the side chains can be adjusted through the molecular weight of each side chain introduced and can be determined by calculation. It can also be determined by $^1$H-NMR measurement.

When the side chain is too small, its function to provide the space which allows for the reversible reaction of the photochromic compound molecule tends to be insufficient. In contrast, when the side chain is too large, densely mixing the later-described photochromic compound with the (A) polyrotaxane monomer will be difficult and eventually, the sufficient utilization of the space provided by the (A) polyrotaxane monomer tends to be difficult.

Further, the above side chain is introduced by using a functional group contained in the cyclic molecule and modifying the functional group. For example, an α-cyclodextrin ring has 18 OH groups (hydroxyl groups) as functional groups, through which side chains are introduced. Namely, a maximum of 18 side chains can be introduced into a single α-cyclodextrin ring. In the present invention, 6% or more, particularly 30% or more of the number of all the functional groups contained in the ring are preferably modified with side chains to sufficiently exhibit the above-described function of the side chains. The functional groups in the cyclic molecules may affect compatibility with other components, and particularly when the functional groups are OH groups, compatibility with other components is greatly affected. For this reason, the ratio of the modified functional groups (degree of modification) is preferably 6% or more to 80% or less, and more preferably 30% or more to 70% or less. As also described in detail later, since the reactivity of the functional groups contained in the cyclic molecules is lower than the reactivity of OH groups in the side chains, problems such as reduced compatibility and bleed out barely occur even when the degree of modification is low. Thus, better effects are exhibited when the degree of modification is in the above range. When a side chain is bonded to 9 out of 18 hydroxyl groups contained in the above α-cyclodextrin ring, the degree of modification is 50%.

In the present invention, the above side chains (organic chains) can be linear or branched as long as they have an OH group in their organic chains. Intended side chains can be introduced by reacting the functional groups of the cyclic molecules with the OH group-containing organic chains (side chains) by making use of ring-opening polymerization, radical polymerization, cationic polymerization, anionic polymerization, or living radical polymerization such as atom-transfer radical polymerization, RAFT polymerization or NMP polymerization.

For example, a side chain derived from a cyclic compound such as a lactone-based compound or a cyclic ether can be introduced by ring-opening polymerization. A Side chain introduced by the ring-opening polymerization of a cyclic compound such as a lactone-based compound or a cyclic ether will have an OH group introduced in an end of the side chain.

From the viewpoints of high availability, high reactivity, and in addition, the ease of size (molecular weight) control, a cyclic ether or a lactone-based compound is preferably used. Specific examples of the preferable cyclic compounds are as described below.

Cyclic Ethers;

ethylene oxide, 1,2-propylene oxide, epichlorohydrin, epibromohydrin, 1,2-butylene oxide, 2,3-butylene oxide, isobutylene oxide, oxetane, 3-methyl oxetane, 3,3-dimethyloxetane, tetrahydrofuran, 2-methyl tetrahydrofuran, and 3-methyl tetrahydrofuran.

Lactone-Based Compounds;

4-membered ring lactones such as β-propiolactone, β-methyl propiolactone and L-serine-β-lactone.

5-membered ring lactones such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolan-4-one, α-bromo-γ-butyrolactone, γ-crotonolactone, α-methylene-γ-butyrolactone, α-methacryloyloxy-γ-butyrolactone, and β-methacryloyloxy-γ-butyrolactone.

6-membered lactones such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, δ-lactone 4-hydroxy-1-cyclohexane carboxylate, monomethyl-δ-valerolactone, monoethyl-δ-valerolactone, monohexyl-δ-valerolactone, 1,4-dioxan-2-one, and 1,5-dioxepan-2-one.

7-membered ring lactones such as monoalkyl-ε-caprolactone, dialkyl-ε-caprolactone, monomethyl-ε-caprolactone, monoethyl-ε-caprolactone, monohexyl-ε-caprolactone, dimethyl-ε-caprolactone, di-n-propyl-ε-caprolactone, di-n-hexyl-ε-caprolactone, trimethyl-ε-caprolactone, triethyl-ε-caprolactone, tri-n-ε-caprolactone, s-caprolactone, 5-nonyl-oxepan-2-one, 4,4,6-trimethyl-oxepan-2-one, 4,6,6-trimethyl-oxepan-2-one, and 5-hydroxymethyl-oxepan-2-one.

8-membered ring lactones such as ξ-enantholactone other lactones such as lactone, lactide, dilactide, tetramethyl glycoside, 1,5-dioxepan-2-one, and t-butyl caprolactone.

The above cyclic compounds may be used alone or in combination.

In the present invention, lactone-based compounds are preferably used. For example, ε-caprolactone, α-acetyl-γ-butyrolactone, α-methyl-γ-butyrolactone, γ-valerolactone, and γ-butyrolactone are particularly preferable, and ε-caprolactone is the most preferable.

When side chains are introduced by reacting cyclic compounds via ring-opening polymerization, a functional group (e.g., hydroxyl group) bonding to the ring is poorly reactive and the direct reaction with a large molecule may be difficult due to steric hindrance or the like. In this case, a means to introduce side chains can be employed in which, when caprolactone is reacted, for example, a low-molecular weight compound such as propylene oxide is reacted with the functional group to effectuate hydroxypropylation to introduce a highly-reactive functional group (hydroxyl group), and thereafter ring-opening polymerization of the above cyclic compounds is performed. In this case, the hydroxypropylated moieties can also be regarded as side chains.

According to the present invention, side chains are introduced by performing ring-opening polymerization of the above compounds. The side chains thus-introduced by the above-mentioned compounds are referred to as side chains derived from the above-mentioned compounds. Namely, a side chain obtained by introducing a lactone-based compound is referred to as a side chain derived from a lactone-based compound. In the present invention, a side chain introduced into the polyrotaxane compound is preferably derived from a lactone-based compound.

With respect to the (A) polyrotaxane monomer used in the present invention, the method of introducing side chains via ring-opening polymerization is preferably adopted to introduce side chains having OH groups into the cyclic molecules when the ease of side chain introduction, the ease of controlling a side chain size (molecular weight), and the modification of the OH groups are taken into consideration. Thus, a side chain having a terminal OH group is preferably introduced.

(Modification of OH Groups in the Side Chains of Polyrotaxane Compound (Preparation of the (A) Polyrotaxane Monomer))

In the (A) polyrotaxane monomer used in the present invention, OH groups in the side chains of the polyrotaxane compound are reacted with a compound having a radical-polymerizable group to introduce the radical-polymerizable groups into the side chains of the polyrotaxane compound. In the present invention, the reaction in which an OH group in a side chain is reacted with another compound as such to introduce a structure derived from the compound is referred to as "modification".

By the introduction of a radical-polymerizable group which can polymerize with later-described (C) polymerizable monomers into the side chain of the cyclic molecule, compatibility with the (C) polymerizable monomer can be increased and further the photochromic compounds can be uniformly maintained in a state in which they are dispersed in spaces formed by the (A) polyrotaxane monomers. As a result, the obtained cured body will sustainably develop excellent photochromic properties and moreover will have increased mechanical strength.

(Compounds Having a Radical-Polymerizable Group)

A compound having a radical-polymerizable group is introduced by making use of the above side chains, and compounds which react with the OH groups in the side chains can be appropriately used. When compatibility with other components is taken into consideration, compounds having a radical-polymerizable group that have no OH group in their molecule are preferred.

The above radical-polymerizable groups are typified by radical-polymerizable groups such as a (meth)acrylate group (methacrylate group and/or acrylate group), a vinyl group, and an allyl group. Among them, a (meth)acrylate group is the most preferable when the ease of cured body production and the versatility of the obtained cured bodies are taken into consideration.

A compound having a radical-polymerizable group has both a functional group capable of reacting with an OH group in the side chains and a radical-polymerizable group in its molecule. Examples of the functional groups capable of reacting with an OH group include an isocyanate group (—NCO group), a carboxyl group (—COOH), and a group of an acid chloride (e.g., —COCl group). By reacting the OH groups in the side chains with a compound having an isocyanate group, a radical-polymerizable group is introduced via a urethane bond. Alternatively, by reacting the OH groups in the side chains with a compound having a carboxyl group, a group of an acid chloride, and the like, a radical-polymerizable group is introduced via an ester bond.

Specific examples of the compound having a radical-polymerizable group include compounds having an isocyanate group and a (meth)acrylate group such as 2-isocyanatoethyl methacrylate, 2-isocyanatoethyl acrylate, and 1,1-(bisacryloyloxymethyl)ethyl isocyanate.

A compound having an acid chloride (—COCl group) and a (meth)acrylate group can be synthesized by reacting a compound having a carboxyl group and a (meth)acrylate group with a chlorinating agent such as thionyl chloride.

Examples of the compound having a carboxyl group and a (meth)acrylate group are 2-methacryloyloxyethyl succinate and β-carboxyethyl acrylate.

For the reaction of the compound having a radical-polymerizable group and an OH group in the side chains, known conditions for a reaction between the functional groups capable of reacting with an OH group and OH groups can be adopted.

((A) Polyrotaxane Monomer; Ratio of Modification with a Compound Having Radical-Polymerizable Group)

With respect to the (A) polyrotaxane monomer used in the present invention, the ratio of modification of OH groups in the side chains with the radical-polymerizable group, namely the reaction ratio of the compound having the radical-polymerizable group in relation to all the OH groups in the side chains (by number of moles), must be 1 mol % or more to less than 100 mol %. The modification ratio can be calculated by the equation (the number of moles of the introduced radical-polymerizable groups)/(the number of moles of all the OH groups in the side chains)×100.

According to the studies by the present inventors, it was proved as shown in the comparative examples that when a polyrotaxane monomer with the modification ratio of 100 mol % is used, the obtained cured bodies tend to frequently have cracks and the like. This phenomenon was notably observed when a photochromic layer was formed on an optical substrate by a coating method. A reason for this was considered to be attributable to the locally increased cross-linking density of the obtained cured body. In contrast, as shown in the inventive examples, when the modification ratio of the (A) polyrotaxane monomer is less than 100 mol %, the occurrence of cracks in the photochromic layer can be prevented. In addition, when a polyrotaxane monomer with a modification ratio of less than 1 mol % is used, the cured body does not retain the polyrotaxane and bleed out occurs easily. Moreover, the polyrotaxane monomer as such is not preferred since the mechanical strength and photochromic properties of the obtained cured bodies deteriorate. When the yield, mechanical strength and photochromic properties and the like of the obtained cured bodies are taken into consideration, the ratio of modification with the compound having a radical-polymerizable group is preferably 10 mol % or more to 95 mol % or less.

With respect to the cured body obtained herein, the ratio of modification with the compound having a radical-polymerizable group is more preferably more than 70 mol % to 95 mol % or less, still more preferably 75 mol % or more to 95 mol % or less in order to reduce bleed out and improve mechanical strength. The (A) polyrotaxane monomer can also be modified with a compound not containing a radical-polymerizable group as later described in detail. Thus, the remaining OH groups in the side chains can be modified with a compound not containing a radical-polymerizable group, which will be later described in detail. In this case, however, OH groups may remain since the modification ratio is high.

In addition, the ratio of modification with the compound having a radical-polymerizable group is preferably 1 mol % or more to less than 40 mol %, more preferably 5 mol % or more to 35 mol % or less in order to enhance photochromic properties and increase yield while maintaining the mechanical strength of the obtained cured bodies. In this case also, the remaining OH groups in the side chains can be modified with a compound not containing a radical-polymerizable group. The modification with a compound not containing a radical-polymerizable group is preferred since compatibility with other components could reduce as the ratio of the remaining OH groups increases.

(Modification with a Compound not Containing a Radical-Polymerizable Group)

The (A) polyrotaxane monomer used in the present invention must be modified with a compound having a radical-polymerizable group. A part of OH groups in the side chains (namely OH groups contained in the side chains not modified with the compound having a radical-polymerizable group) may remain as OH groups or may be modified with a compound not containing a radical-polymerizable group.

The compound not containing a radical-polymerizable group has a functional group capable of reacting with an OH group in the side chains in its molecule and does not contain a radical-polymerizable group in the molecule. "Does not contain a radical-polymerizable group" means not containing the radical-polymerizable groups described in the section "Compounds having radical-polymerizable group" above. Thus, the compound not containing a radical-polymerizable group preferably has, instead of the above radical-polymerizable groups, an alkyl group having a carbon number of 2 to 20, an alkyleneoxy group having a carbon number of 2 to 30, or an aryl group having a carbon number of 6 to 20. As the functional group capable of reacting with an OH group in the side chains, the same functional groups as those described in the section "Compounds having radical-polymerizable group" above are mentioned. The compound not containing a radical-polymerizable group is preferably a compound which has neither a radical-polymerizable group nor a hydroxyl (OH) group.

As the compound not containing a radical-polymerizable group, isocyanate compounds having a carbon number of 2 to 20 (excluding the carbon atoms in an isocyanate group) are preferable, and isocyanate compounds having a carbon number of 3 to 10 are particularly preferable from the viewpoints of raw material availability and high reactivity with an OH group as a compound having an isocyanate group. Specific examples of the preferable isocyanate compounds include n-propyl isocyanate, n-butyl isocyanate, n-pentyl isocyanate, n-hexyl isocyanate, and phenylisocyanate.

As the compound not containing a radical-polymerizable group, carboxylic acid chlorides having a carbon number of 2 to 20 (excluding the carbon atoms in a carbonyl group) are preferable and carboxylic acid chlorides having a carbon number of 2 to 10 are particularly preferable from the viewpoints of raw material availability and high reactivity with OH groups as a carboxylic acid chloride. Specific examples of the preferable acid chlorides include acetyl chloride, propionyl chloride, butyryl chloride, pivaloyl chloride, hexanoyl chloride, and benzoyl chloride.

The ratio of modification with the compound not containing a radical-polymerizable group can be calculated by (the number of moles of the compound not containing a radical-polymerizable group introduced)/(the number of moles of all the OH groups in the side chains)×100. The modification ratio is not particularly limited. When the yield, mechanical strength, and photochromic properties of the obtained cured bodies are taken into consideration, the ratio of the modification with the compound not containing a radical-polymerizable group is preferably more than 0 mol % to 99 mol % or less, more preferably from 5 mol % or more to 90 mol % or less.

(Preferable Modification Ratio)

In the (A) polyrotaxane monomer used in the present invention, 1 mol % or more to less than 100 mol % of OH groups in the side chains are modified with the compound having a radical-polymerizable group as described above. OH groups in the side chains not modified with the compound having a radical-polymerizable group may remain as OH groups or may be modified with the compound not containing a radical-polymerizable group as described above. For the properties of the obtained cured bodies, the modification ratio described below is preferred.

(In Cases where Mechanical Strength is Increased and Bleed Out is Reduced)

In order to further increase mechanical strength, reduce bleed out and maintain transparency at a high level regarding the obtained cured bodies, the modification ratio is preferably adjusted as described below. Namely, it is more preferable that, in relation to 100 mol % of all the OH groups in the side chains of the polyrotaxane compound, the ratio of modification with the compound having a radical-polymerizable group is more than 70 mol % to 95 mol % or less, the ratio of modification with the compound not containing a radical-polymerizable group is 0 mol % or more to less than 30 mol %, and the ratio of remaining OH groups (namely unmodified OH groups) is 0 mol % or more to less than 30 mol %, and further it is particularly preferable that the ratio of modification with the compound having a radical-polymerizable group is 75 mol % or more to 95 mol % or less, the ratio of modification with the compound not containing a radical-polymerizable group is 0 mol % or more to 25 mol % or less, and the ratio of remaining OH groups is 0 mol % or more to 25 mol % or less.

Particularly, when the productivity of the (A) polyrotaxane monomer per se is taken into consideration, it is particularly preferable that, in relation to 100 mol % of all the OH groups in the side chains of the polyrotaxane compound, the ratio of modification with the compound having a radical-polymerizable group is more than 75 mol % to 95 mol % or less, and the ratio of remaining OH groups is 5 mol % or more to less than 25 mol %. In this case, it is particularly preferable that the ratio of modification with the compound not containing a radical-polymerizable group is 0 mol %.

With respect to the above compounding ratio, the total of the ratio of modification with the compound having a radical-polymerizable group, the ratio of modification with the compound not containing a radical-polymerizable group, and the ratio of remaining OH groups is 100 mol %.

(In Cases where Yield is Increased and Photochromic Properties are Improved)

In order to maintain mechanical strength, improve photochromic properties, reduce bleed out, maintain high transparency, and further increase yield of cured bodies, the modification ratio is preferably adjusted as described below. Namely, it is preferable that, in relation to 100 mol % of all the OH groups in the side chains of the polyrotaxane compound, the ratio of modification with the compound having a radical-polymerizable group is 1 mol % or more to less than 40 mol %, the ratio of modification with the compound not containing a radical-polymerizable group is more than 0 mol % to 65 mol % or less, and the ratio of remaining OH groups is 0 mol % or more to 60 mol % or less, and it is further preferable that the ratio of modification with the compound having a radical-polymerizable group is 5 mol % or more to 38 mol % or less, the ratio of modification with the compound not containing a radical-polymerizable group is 2 mol % or more to 65 mol % or less, and the ratio of remaining OH groups is 0 mol % or more to 60 mol % or less.

Particularly, it is preferable that the ratio of modification with the compound having a radical-polymerizable group is 5 mol % or more to 35 mol % or less, the ratio of modification with the compound not containing a radical-polymerizable group is 5 mol % or more to 65 mol % or less, and the ratio of remaining OH groups is 5 mol % or more to 60 mol % or less.

With respect to the above compounding ratio, the total of the ratio of modification with the compound having a radical-polymerizable group, the ratio of modification with the compound not containing a radical-polymerizable group, and the ratio of remaining OH groups is 100 mol %.

(Novel Polyrotaxane Monomer)

Among the (A) polyrotaxane monomers used in the present invention, a polyrotaxane monomer per se having the modification ratio below is a novel compound. Namely, a polyrotaxane monomer in which, in a polyrotaxane compound having a composite molecular structure composed of an axial molecule and a plurality of cyclic molecules threaded onto the axial molecule, and side chains having OH groups introduced into the cyclic molecules, OH groups in the side chains are modified, and in which 1 mol % or more to less than 100 mol % of OH groups in the side chains are modified with the compound having a radical-polymerizable group, more than 0 mol % to 99 mol % or less of OH groups in the side chains are modified with the compound not containing a radical-polymerizable group, and the remaining ratio of OH groups in the side chains (namely the ratio of the remaining OH groups) is 0 mol % or more to 60 mol % or less, is a novel compound. This novel polyrotaxane monomer is a compound based on a specific concept of the (A) polyrotaxane monomers. In other words, the novel polyrotaxane monomer is characterized by being modified with both a compound having a radical-polymerizable group and a compound not containing a radical-polymerizable group. The novel polyrotaxane monomer improves the mechanical strength of the obtained cured bodies and enhances compatibility with other components.

In order to more effectively achieve the above effects, it is preferable that the ratio of modification with the compound having a radical-polymerizable group is 5 mol % or more to 38 mol % or less, the ratio of modification with the compound not containing a radical-polymerizable group is 2 mol % or more to 65 mol % or less, and the ratio of the remaining OH groups is 0 mol % or more to 60 mol % or less.

It is further preferable that the ratio of modification with the compound having a radical-polymerizable group is 5 mol % or more to 35 mol % or less, the ratio of modification with the compound not containing a radical-polymerizable group is 5 mol % or more to 65 mol % or less, and the ratio of the remaining OH groups is 5 mol % or more to 60 mol % or less.

Particularly, to increase compatibility with other components, it is preferable that 5 mol % or more to 35 mol % or less of OH groups in the side chains are modified with the compound having a radical-polymerizable group, 25 mol % or more to 60 mol % or less of OH groups in the side chains are modified with the compound not containing a radical-polymerizable group, and the remaining ratio of OH groups in the side chains is 5 mol % or more to 40 mol % or less.

With respect to the above compounding ratio, the total of the ratio of modification with the compound having a radical-polymerizable group, the ratio of modification with the compound not containing a radical-polymerizable group, and the remaining ratio of OH groups in the side chains is 100 mol %.

(Structure and Molecular Weight of Preferable (A) Polyrotaxane Monomers)

The (A) polyrotaxane monomers which are preferably used in the present invention are such that, in a polyrotaxane compound in which, among the above components, a polyethylene glycol having an adamantyl group bonding to both ends is the axial molecule, the cyclic molecules have α-cyclodextrin rings, and further side chains (terminated with an OH group) are introduced into the rings with the use of polycaprolactone, OH groups in the side chains are modified with the compound having a radical-polymerizable group.

In addition, the (A) polyrotaxane monomer modified with the compound having a radical-polymerizable group and the compound not containing a radical-polymerizable group that is used depending on necessity preferably has a weight average molecular weight Mw within a range of 100,000 to 1,000,000. Due to the weight average molecular weight Mw of the (A) polyrotaxane monomer in the above range, compatibility with other components increases, resulting in further increase in the transparency of the cured bodies. When compatibility with other components and the transparency of the cured bodies are taken into consideration, the weight average molecular weight Mw of the (A) polyrotaxane monomer is more preferably in a range of 150,000 to 800,000, still more preferably 150,000 to 650,000, and particularly preferably 150,000 to 500,000. The weight average molecular weight Mw is a value measured by a GPC measuring method described in the examples below.

The process for producing the (A) polyrotaxane monomer used in the present invention is not particularly limited. Examples of the process for producing the (A) polyrotaxane monomer include a process in which the polyrotaxane compound is reacted with the compound having a radical-polymerizable group (to modify OH groups in the side chains) to give the (A) polyrotaxane monomer (Process 1), a process in which the polyrotaxane compound is reacted with the compound having a radical-polymerizable group (to modify OH groups in the side chains) and is subsequently reacted with the compound not containing a radical-polymerizable group (to modify OH groups in the side chains) to give the (A) polyrotaxane monomer (Process 2), a process in which the polyrotaxane compound is reacted with the compound not containing a radical-polymerizable group (to modify OH groups in the side chains) and is subsequently reacted with the compound having a radical-polymerizable group (to modify OH groups in the side chains) to give the (A) polyrotaxane monomer (Process 3), and a process in which the polyrotaxane compound, the compound having a radical-polymerizable group, and the compound not containing a radical-polymerizable group are reacted (to modify OH groups in the side chains) to give the (A) polyrotaxane monomer (Process 4).

(B) Photochromic Compound;

Photochromic compounds known per se may be used as the photochromic compound exhibiting photochromic properties (this compound may hereinafter be simply called "(B) component"), and the compounds may be used alone or in combination of two or more.

The photochromic compounds as such are typified by fulgide compounds, chromene compounds and spirooxazine compounds, which are disclosed in a lot of documents such as JP Patent Application Publication No. H02-28154, JP Patent Application Publication No. S62-288830, WO 94/22850, and WO 96/14596.

In the present invention, chromene compounds having an indeno[2,1-f]naphtho[1,2-b]pyran backbone structure are more preferably used among known photochromic compounds from the viewpoint of photochromic properties such as color optical density, initial coloration, durability and fading speed, and particularly chromene compounds having a molecular weight of 540 or more are preferably used due to their superiority in color optical density and fading speed.

The following are examples of chromene compounds which are particularly preferably used in the present invention.

[Chem. 1]

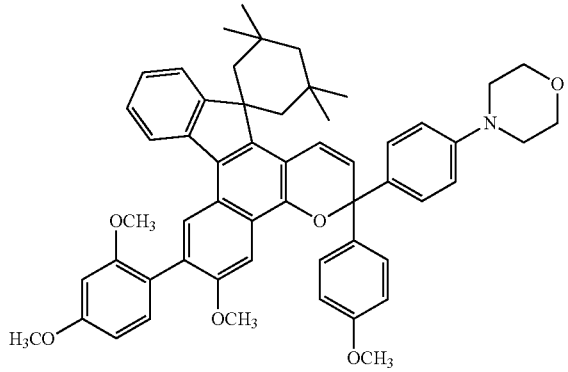

[Chem. 2]

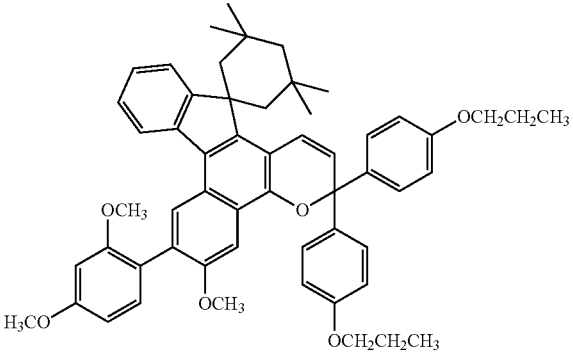

[Chem. 3]

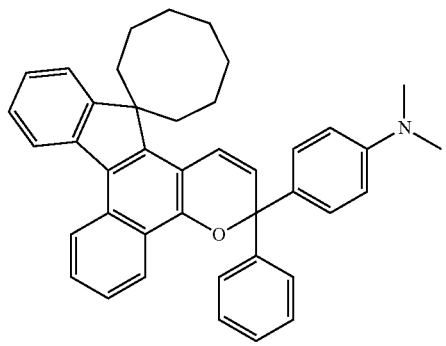

[Chem. 4]

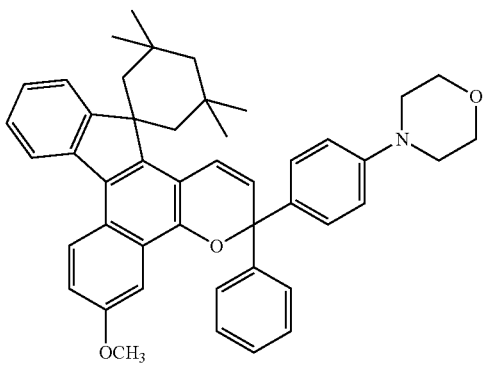

(C) Polymerizable Monomers Other than the (A) Polyrotaxane Monomer

The photochromic curable composition according to the present invention comprises a polymerizable monomer other than the (A) polyrotaxane monomer (this monomer may hereinafter be simply called (C) polymerizable monomer or (C) component).

The (C) polymerizable monomers are not particularly limited and known monomers may be used. Particularly, the photochromic curable composition of the present invention preferably comprises a polyfunctional (meth)acrylate monomer having two or more (meth)acrylate groups in its molecule. In addition, the photochromic curable composition of the present invention preferably comprises a bifunctional (meth)acrylate monomer having two (meth)acrylate groups in its molecule (this monomer may hereinafter be simply called "(C1) bifunctional (meth)acrylate monomer" or (C1) component), or a polyfunctional (meth)acrylate monomer having three or more (meth)acrylate groups in its molecule (this monomer may hereinafter be simply called "(C2) polyfunctional (meth)acrylate monomer" or (C2) component). The photochromic curable composition of the present invention may also comprise a monofunctional (meth)acrylate monomer having a single (meth)acrylate group (this monomer may hereinafter be simply called (C3) monofunctional (meth)acrylate monomer or (C3) component). These (C) polymerizable monomers are described below.

(C1) Bifunctional (Meth)Acrylate Monomer;

The photochromic curable composition of the present invention preferably comprises the (C1) bifunctional (meth)acrylate monomer having two (meth)acrylate groups in its molecule. Specific examples thereof are described below. Specifically, compounds represented by the formulae (1), (2) and (3) below are included therein. Compounds represented by the formula (1) below may hereinafter be simply called (C1-1) component, compounds represented by the formula (2) below may hereinafter be simply called (C1-2) component, and compounds represented by the formula (3) below may hereinafter be simply called (C1-3) component. In addition, bifunctional (meth)acrylate monomers having a urethane bond (these monomers may hereinafter be simply called (C1-4) component), and bifunctional (meth)acrylate monomers not included in the (C1-1) component, (C1-2) component, (C1-3) component, or (C1-4) components (these monomers may hereinafter be simply called (C1-5) component) are described.

(C1-1) Compounds Represented by the Following Formula (1)

[Chem. 5]

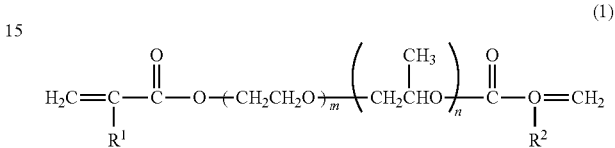

(1)

In the formula, $R^1$ and $R^2$ are independently of each other a hydrogen atom or a methyl group, m and n are independently of each other an integer of 0 or more, and m+n is an integer of 2 or more.

Specific examples of compounds represented by the above formula (1) are as follows: diethyleneglycol dimethacrylate, triethyleneglycol dimethacrylate, tetraethyleneglycol dimethacrylate, pentaethyleneglycol dimethacrylate, pentapropyleneglycol dimethacrylate, diethyleneglycol diacrylate, triethyleneglycol diacrylate, tetraethyleneglycol diacrylate, pentaethyeleneglycol diacrylate, tripropyleneglycol diacrylate, tetrapropyleneglycol diacrylate, pentapropyleneglycol diacrylate, dimethacrylate formed from a mixture of polypropyleneglycol and polyethylene glycol (with polyethylene having two repeating units and polypropylene having two repeating units), polyethylene glycol dimethacrylate (particularly having an average molecular weight of 330), polyethylene glycol dimethacrylate (particularly having an average molecular weight of 536), polyethylene glycol dimethacrylate (particularly having an average molecular weight of 736), tripropylenglycol dimethacrylate, tetrapropyleneglycol dimethacrylate, polypropyleneglycol dimethacrylate (particularly having an average molecular weight of 536), polyethylene glycol diacrylate (particularly having an average molecular weight of 258), polyethylene glycol diacrylate (particularly having an average molecular weight of 308), polyethylene glycol diacrylate (particularly having an average molecular weight of 508), polyethylene glycol diacrylate (particularly having an average molecular weight of 708), and polyethylene glycol methacrylate acrylate (particularly having an average molecular weight of 536).

(C1-2) Compounds Represented by the Following Formula (2)

[Chem. 6]

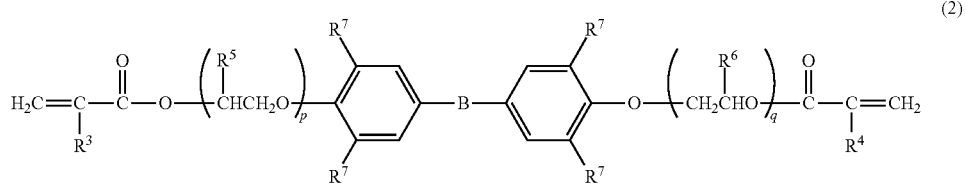

(2)

In the formula, $R^3$ and $R^4$ are independently of each other a hydrogen atom or a methyl group, $R^5$ and $R^6$ are independently of each other a hydrogen atom or a methyl group, each $R^7$ independently of each other is a hydrogen atom or a halogen atom, B is any one of —O—, —S—, —(SO$_2$)—, —CO—, —CH$_2$—, —CH=CH—, —C(CH$_3$)$_2$—, and —C(CH$_3$)(C$_6$H$_5$)—, and p and q are each an integer of 1 or more, and p+q on average is 2 or more to 30 or less.

Polymerizable monomers represented by the above formula (2) are ordinarily obtained in the form of a mixture of molecules having different molecular weights. Thus, p and q are given as average values.

As specific examples of compounds represented by the above formula (2), the following bisphenol A di(meth)acrylates can be mentioned:

2,2-bis[4-methacryloyloxy.ethoxy)phenyl]propane (p+q=2), 2,2-bis[4-methacryloyloxy.diethoxy)phenyl]propane (p+q=4), 2,2-bis[4-methacryloyloxy.polyethoxy)phenyl]propane (p+q=7), 2,2-bis(3,5-dibromo-4-methacryloyloxyethoxyphenyl)propane (p+q=2), 2,2-bis(4-methacryloyloxydipropoxyphenyl)propane (p+q=4), 2,2-bis[4-acryloyloxy.diethoxy)phenyl]propane (p+q=4), 2,2-bis[4-acryloyloxy.polyethoxy)phenyl]propane (p+q=3), 2,2-bis[4-acryloyloxy.polyethoxy)phenyl]propane (p+q=7), 2,2-bis[4-methacryloyloxy(polyethoxy)phenyl]propane (p+q=10), 2,2-bis[4-methacryloyloxy(polyethoxy)phenyl]propane (p+q=17), 2,2-bis[4-methacryloyloxy(polyethoxy)phenyl]propane (p+q=30), 2,2-bis[4-acryloyloxy(polyethoxy)phenyl]propane (p+q=10), and 2,2-bis[4-acryloyloxy(polyethoxy)phenyl]propane (p+q=20).

(C1-3) Compounds Represented by the Following Formula (3)

[Chem. 7]

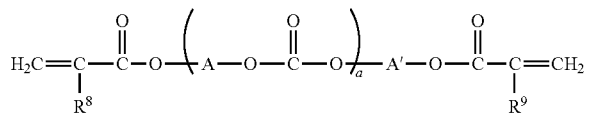

(3)

In the formula, $R^8$ and $R^9$ are independently of each other a hydrogen atom or a methyl group, a is a number of 1 to 20 on average, A and A' may be the same or different and each is a linear or branched alkylene group having a carbon number of 2 to 15. When a plurality of A are present, the plurality of A may be the same or different groups.

Compounds represented by the above formula (3) can be produced by reacting a polycarbonate diol with (meth)acrylic acid.

Examples of the polycarbonate diols used herein include the following:

Specifically, polycarbonate diols (having a number average molecular weight of 500 to 2,000) obtained by phosgenating a polyalkylene glycol such as trimethylene glycol, tetramethylene glycol, pentamethylene glycol, hexamethylene glycol, octamethylene glycol, or nonamethylene glycol;

polycarbonate diols (number average molecular weight: 500 to 2,000) obtained by phosgenating a mixture of two or more polyalkylene glycols such as a mixture of trimethylene glycol and tetramethylene glycol, a mixture of tetramethylene glycol and hexamethylene glycol, a mixture of pentamethylene glycol and hexamethylene glycol, a mixture of tetramethylene glycol and octamethylene glycol, or a mixture of hexamethylene glycol and octamethylene glycol); and polycarbonate diols (number average molecular weight: 500 to 2,000) obtained by phosgenating 1-methyl trimethylene glycol.

(C1-4) Bifunctional (Meth)Acrylate Having a Urethane Bond

The (C1-4) component is typified by a reaction product of a polyol and a polyisocyanate. Examples of the polyisocyanates include hexamethylene diisocyanate, isophorone diisocyanate, lysin isocyanate, 2,2,4-hexamethylene diisocyanate, dimer acid diisocyanate, isopropylidene bis-4-cyclohexyl isocyanate, dicyclohexylmethane diisocyanate, norbornene diisocyanate and methylcyclohexane diisocyanate.

Examples of the polyols include polyalkylene glycols having a repeating unit of ethylene oxide or propylene oxide having a carbon number of 2 to 4, or hexamethylene oxide, and polyester diols such as polycaprolactone diols. Other examples include polycarbonate diols, polybutadiene diols, or pentaerythritol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexane dimethanol, glycerin, and trimethylolpropane.

In addition, a reaction mixture obtained by further reacting a urethane prepolymer obtained by a reaction between the above polyisocyanates and polyols with 2-hydroxy (meth)acrylate, and urethane (meth)acrylate monomers which are reaction mixtures obtained by directly reacting the above diisocyanates with 2-hydroxy(meth)acrylate, and the like may also be used.

Examples of bifunctional products include U-2PPA (molecular weight: 482), UA-122P (molecular weight: 1,100) and U-122P (molecular weight: 1,100) of Shin-Nakamura Chemical Co., Ltd., and EB4858 (molecular weight: 454) of Daicel-UCB Co., Ltd.

(C1-5) Other Bifunctional(Meth)Acrylate Monomers

Examples of the (C1-5) component are compounds having a (meth)acrylate group in both ends of an alkylene group which may have a substituent. As the (C1-5) component, compounds having an alkylene group with a carbon number of 6 to 20 are preferred. Specific examples include 1,6-hexanediol diacrylate, 1,6-hexanediol dimethacrylate, 1,9-nonanediol diacrylate, 1,9-nonanediol dimethacrylate, 1,10-decanediol diacrylate, and 1,10-decanediol dimethacrylate.

In addition, bifunctional (meth)acrylate monomers containing a sulfur atom can be referred to as the (C-5) component. A sulfur atom is preferably in the form of a sulfide group constituting a moiety of a molecular chain. Specific examples include bis(2-methacryloyloxyethylthioethyl)sulfide, bis(methacryloyloxyethyl)sulfide, bis(acryloyloxyethyl)sulfide, 1,2-bis(methacryloyloxyethylthio)ethane, 1,2-bis(acryloyloxyethyl)ethane, bis(2-methacryloyloxyethylthioethyl)sulfide, bis(2-acryloyloxyethylthioethyl)sulfide, 1,2-bis(methacryloyloxyethylthioethylthio)ethane, 1,2-bis(acryloyloxyethylthioethylthio)ethane, 1,2-bis(methacryloyloxyisopropylthioisopropyl)sulfide, and 1,2-bis(acryloyloxyisopropylthioisopropyl)sulfide.

A single component or a plurality of the components explained above may be used as each of the above (C1-1) component, (C1-2) component, (C1-3) component, (C1-4)

component, and (C1-5) component. When a plurality of the components are used, the total mass of the plurality of the components is regarded as the reference mass of the (C1) component.

Next, the (C2) polyfunctional (meth)acrylate monomers having three or more (meth)acrylate groups in their molecule are described.

(C2) Polyfunctional (Meth)Acrylate Monomer

Examples of the (C2) component include compounds represented by the formula (4) below (these compounds may hereinafter be simply called (C2-1) component), polyfunctional(meth)acrylate monomers having a urethane bond (these monomers may hereinafter be simply called (C2-2) component), and polyfunctional (meth)acrylate monomers not included in the (C2-1) component or (C2-2) component (these monomers may hereinafter be simply called (C2-3) component).

(C2-1) Compounds Represented by the Formula (4) Below

As the polyfunctional (meth)acrylate monomers, compounds represented by the following formula (4) are mentioned.

[Chem. 8]

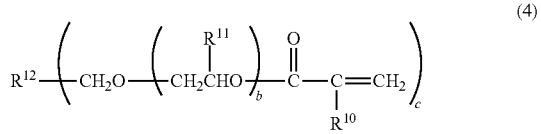

(4)

In the formula, each $R^{10}$ independently of each other is a hydrogen atom or a methyl group, each $R^{11}$ independently of each other is a hydrogen atom or an alkyl group having a carbon number of 1 to 2, $R^{12}$ is a trivalent to hexavalent organic group having a carbon number of 1 to 10, and b is a number of 0 to 3 on average and c is a number of 3 to 6.

As the alkyl groups having a carbon number of 1 to 2 represented by $R^{11}$, a methyl group is preferred. As the organic groups represented by $R^{12}$, organic groups comprising a group derived from a polyol, a trivalent to hexavalent hydrocarbon group, and a trivalent to hexavalent urethane bond are mentioned.

Specific examples of compounds represented by the above formula (4) are as follows: trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate, and ditrimethylolpropane tetraacrylate.

(C2-2) Polyfunctional (Meth)Acrylate Monomers Having a Urethane Bond

The (C2-2) component is obtained by a reaction between the polyisocyanate compound and the polyol compound described regarding the above (C1-4) component and is a compound having three or more (meth)acrylate groups in its molecule. Examples of commercial products include U-4HA (molecular weight: 596, number of functional groups: 4), U-6HA (molecular weight: 1,019, number of functional groups: 6), U-6LPA (molecular weight: 818, number of functional groups: 6) and U-15HA (molecular weight: 2,300, number of functional groups: 15) of Shin-Nakamura Chemical Co., Ltd.

(C2-3) Polyfunctional (Meth)Acrylate Monomers

The (C2-3) component is a compound in which an end of a polyester compound is modified with a (meth)acrylate group. Various commercial products of polyester(meth)acrylate compounds may be used depending on the molecular weight of a raw material polyester compound and the amount of modification with a (meth)acrylate group. Specific examples include tetrafunctional polyester oligomers (having molecular weight of 2,500 to 3,500, EB80, Daicel-UCB Co., Ltd., etc.), hexafunctional polyester oligomers (having a molecular weight of 6,000 to 8,000, EB450, Daicel-UCB Co., Ltd., etc.), hexafunctional polyester oligomers (having a molecular weight of 45,000 to 55,000, EB1830, Daicel-UCB Co., Ltd., etc.), and tetrafunctional polyester oligomers (particularly those having a molecular weight of 10,000, GX8488B, Dai-ichi Kogyo Seiyaku Co., Ltd., etc.).

With the use of the above-mentioned (C2) component (i.e., (C2-1) component, (C2-2) component and (C2-3) component), crosslinking density is increased by polymerization and the surface hardness of the obtained cured bodies can be enhanced. Thus, photochromic cured bodies (laminates) obtained by a coating method particularly preferably contain the (C2) components. Among the (C2) components, the (C2-1) components are used particularly preferably.

With respect to the above (C2-1) component, (C2-2) component, and (C3-3) component, a single type or a plurality of types of the components may be used. When a plurality of the components are used, the total mass of the plurality of the components are regarded as the reference mass of the (C2) component.

Next, the (C3) monofunctional (meth)acrylate monomers having a single (meth)acrylate group are described.

(C3) Monofunctional (Meth)Acrylate Monomers

As the (C3) component, compounds represented by the following formula (5) are mentioned for example.

[Chem. 9]

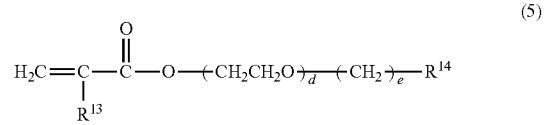

(5)

In the formula, $R^{13}$ is independently of each other a hydrogen atom or a methyl group, $R^{14}$ is a hydrogen atom, a methyldimethoxysilyl group, a trimethoxysilyl group, or a glycidyl group, d is an integer of 0 to 10, and e is an integer of 0 to 20.

Specific compounds represented by the above formula (5) are as follows: methoxy polyethylene glycol methacrylate (especially average molecular weight of 293), methoxy polyethylene glycol methacrylate (especially average molecular weight of 468), methoxy polyethylene glycol acrylate (especially average molecular weight of 218), methoxy polyethylene glycol acrylate (especially average molecular weight of 454), stearyl methacylate, lauryl methacrylate, methyl acrylate, ethyl acrylate, butyl acrylate, octyl acrylate, lauryl acrylate, γ-methacryloyloxypropyl trimethoxysilane, γ-methacryloyloxypropylmethyl dimethoxysilane, and glycidyl methacrylate.

Compounding Ratio of Each Component of (C) Component

The (C) polymerizable monomer preferably comprises the (C1) component, the (C2) component, and if needed, the (C3) component. When the total amount of the (C) component is regarded as 100% by mass, the amounts of the (C1), (C2) and (C3) components are preferably 30 to 80% by mass, 10 to 55% by mass, and 0 to 20% by mass, respectively, more preferably 30 to 80% by mass, 10 to 50% by mass, and 0 to 20% by mass, respectively, still more preferably 35 to 70% by mass, 20 to 50% by mass, and 1 to 15% by mass, respectively, and particularly preferably 40 to 70% by mass, 25 to 50% by mass, and 1 to 10% by mass, respectively, in terms of the hardness, mechanical strength, productivity, and photochromic properties such as color optical density and fading speed of the obtained cured bodies.

The photochromic curable composition of the present invention comprises the above (A) components, (B) components, and (C) components as essential components. The photochromic curable composition may also comprise known additive components as described below.

(Polymerization Initiator)

Polymerization initiators include thermal polymerization initiators and photopolymerization initiators. Specific examples thereof are described below.

Examples of thermal polymerization initiators include:

Diacyl peroxides; benzoyl peroxide, p-chlorobenzoyl peroxide, decanoyl peroxide, lauroyl peroxide, and acetyl peroxide, Peroxy esters; t-butylperoxy-2-ethyl hexanate, t-butyl peroxyneodecanate, cumyl peroxyneodecanate, and t-butyl peroxybenzoate, Percarbonates; diisopropyl peroxydicarbonate, and di-sec-butyl peroxydicarbonate; and Azo compounds; azobisisobutyronitrile.

Examples of photopolymerization initiators include:

Acetophenone-based compounds; 1-phenyl-2-hydroxy-2-methylpropan-1-one, 1-hydroxycyclohexylphenyl ketone, and 1-(4-isopropylphenyl)-2-hydroxy-2-methylpropan-1-one, α-Dicarbonyl-based compounds; 1,2-diphenylethanedione, and methyl phenylglycoxylate, and Acylphosphine oxide-based compounds; 2,6-dimethylbenzoyldiphenylphosphine oxide, 2,4,6-trimethylbenzoyldiphenylphosphine oxide, 2,4,6-trimethylbenzoyldiphenyl phosphinic acid methyl ester, 2,6-dichlorobenzoyldiphenylphoshine oxide, and 2,6-dimethoxybenzoyldiphenylphosphine oxide.

When a photopolymerization initiator is used, a known polymerization-curing accelerator aid such as a tertiary amine may be used in combination.

(Other Compounding Components)

As long as the effect of the present invention is not impaired, the photochromic curable composition of the present invention may comprise, depending on necessity, various compounding agents known per se, for example, various stabilizers such as ultraviolet absorbents, infrared absorbents, ultraviolet stabilizers, antioxidants, coloring inhibitors, antistatic agents, fluorescent dyes, dyes, pigments, perfumes and the like; additives; solvents; and leveling agents.

Among the above compounding agents, an ultraviolet stabilizer is preferably used since the durability of the photochromic compounds can be improved. As the ultraviolet stabilizers, hindered amine optical stabilizers, hindered phenol antioxidants and sulfur-based antioxidants are known. Particularly preferable ultraviolet stabilizers are as described below.

Bis(1,2,2,6,6-pentamethyl-4-piperidyl)sebacate:

ADEKA STAB LA-52, LA-57, LA-62, LA-63, LA-67, LA-77, LA-82, and LA-87, produced by ADEKA Corporation, .2,6-di-t-butyl-4-methyl-phenol ethylenebis(oxyethylene)bis [3-(5-t-butyl-4-hydroxy-m-tolyl) propionate]:

IRGANOX 1010, 1035, 1075, 1098, 1135, 1141, 1222, 1330, 1425, 1520, 259, 3114, 3790, 5057, 565, and 254, produced by Ciba Specialty Chemicals Co., Ltd.

The amount of the ultraviolet stabilizers used is not particularly limited as long as the effect of the present invention is not impaired, and is ordinarily in a range of 0.001 to 10 parts by mass, particularly 0.01 to 1 part by mass based on 100 parts by mass of the total amount of the (A) components and (C) components. Particularly when a hindered amine optical stabilizer is used, it is used in an amount of 0.5 to 30 mol, more preferably 1 to 20 mol, still more preferably 2 to 15 mol per mol of the (B) component in order to prevent the shift of the adjusted developed color caused by the difference in the effect of improving durability depending on the types of the photochromic compounds.

(Z) Preferable Composition of Photochromic Curable Composition

With respect to the photochromic curable composition of the present invention comprising the above-described (A) polyrotaxane monomer, (B) photochromic compound, and (C) polymerizable monomer as essential components, the (B) component is preferably mixed in an amount of 0.0001 to 10 parts by mass, more preferably 0.001 to 10 parts by mass, still more preferably 0.01 to 10 parts by mass when the total amount of the (A) and (C) components is regarded as 100 parts by mass. Namely, when the amount of the photochromic compound is too small, excellent photochromic properties will be difficult to develop, and when the amount is too large, the photochromic composition will be difficult to handle due to thickening and the like and photochromic properties may be difficult to develop by an intended method.

In order to inhibit the thickening of the photochromic curable composition and to effectively achieve the effects of improving photochromic properties by the (A) polyrotaxane monomer, the (A) polyrotaxane monomer is preferably mixed in the following amount. Namely, when the total amount of the (A) and (C) components is regarded as 100 parts by mass, the amount of the (A) component is preferably 0.1 to 50 parts by mass, more preferably 0.5 to 20 parts by mass, and particularly preferably 0.1 to 10 parts by mass.

Use of Photochromic Curable Composition

With respect to the photochromic curable composition of the present invention, it is preferable to knead the components to give the photochromic curable composition and to subject the photochromic curable composition to polymerization-curing to form a photochromic cured body. Preferably, photochromic properties are developed by this cured body.

Polymerization-curing for the preparation of photochromic cured bodies is carried out by performing radical polymerization by radiating active energy rays such as ultraviolet light and α, β and γ rays, by heating, or by both. Namely, appropriate polymerization means can be employed depending on the types of the polymerizable monomers and the polymerization-curing accelerator, and the form of the photochromic cured bodies to be formed. In cases where a cured body is prepared from the photochromic curable composition of the present invention by a coating method, photopolymerization is preferably adopted since a uniform film thickness can be obtained.

During the photopolymerization of the photochromic curable composition according to the present invention, UV intensity among the polymerization conditions particularly affects the properties of the obtained photochromic cured bodies. The irradiation conditions cannot necessarily be restricted since they are affected by the type and amount of the photopolymerization initiator and the type of the polymerizable monomer, but in general, the conditions are preferably chosen such that 50 to 500 mW/cm$^2$ UV light having a wavelength of 365 nm is radiated for 0.5 to 5 minutes.

When photochromic properties are developed by a lamination method, the photochromic curable composition is used as a coating solution, which is applied onto a surface of an optical substrate such as a lens substrate by spin-coating or dipping, and polymerization-curing is subsequently performed by UV irradiation or heating in an inert gas such as nitrogen to form a photochromic layer composed of a photochromic cured body on a surface of the optical substrate (coating method).

When the photochromic layer is formed on the surface of the optical substrate by the above lamination method (coating method), adhesion between the photochromic layer and the optical substrate can be increased by previously subjecting the surface of the optical substrate to a chemical treatment with an alkali solution or an acid solution, a physical treatment such as corona discharge, plasma discharge or polishing. As a matter of course, it is also possible to previously provide a transparent adhesive resin layer on a surface of the optical substrate.

The above photochromic curable composition of the present invention can develop photochromic properties including excellent color optical density, fading speed, and the like, without deteriorating properties such as mechanical strength and is effectively used in the production of optical substrates to which photochromic properties are imparted such as photochromic lenses. The coating method is described above, but a photochromic cured body can also be prepared of the photochromic curable composition by cast polymerization.

The photochromic layers and photochromic cured bodies formed of the photochromic curable composition of the present invention can undergo post-treatments in accordance with the applications thereof. The post-treatments are exemplified by dying with dyes such as dispersion dyes; hard coating-film formation with the use of silane coupling agents or hard coating agents composed mainly of silicon-, zirconium-, antimony-, aluminum-, tin-, or tungsten sols; thin-film formation by the vapor deposition of metal oxides such as $SiO_2$, $TiO_2$, and $ZrO_2$, an antireflection treatment by using a thin film formed by organic polymer application, and an antistatic treatment.

EXAMPLES

In the following section, the present invention is described in detail on the basis of examples and comparative examples, but the present invention is not limited thereto. First, the measuring instruments used in the present invention and the process for preparing each of the components are described.

(Molecular Weight Measurement; Gel Permeation Chromatography (GPC Measurement))

For GPC measurement, a liquid chromatography system (produced by Nihon Waters K.K.) was used. With regard to columns, Shodex GPC KF-802 (exclusion limit molecular weight: 5,000), KF-802.5 (exclusion limit molecular weight: 20,000), KF-803 (exclusion limit molecular weight: 70,000), KF-804 (exclusion limit molecular weight: 400,000), and KF-805 (exclusion limit molecular weight: 2,000,000) produced by Showa Denko K.K. were appropriately used in accordance with the molecular weight of the samples to be analyzed. Dimethylformamide (DMF) was used as a developing liquid and measurement was performed under the conditions at a flow rate of 1 mL/min and at a temperature of 40° C. Polystyrene was used as a reference sample and a weight average molecular weight was obtained by comparison and conversion. As a detector, a refractive index detector was used.

Synthesis of (A) Polyrotaxane Monomer Having Polymerizable Functional Group-Introduced Side Chains Preparation Examples (1-1) Preparation of PEG-COOH;

Linear polyethylene glycol (PEG) having a molecular weight of 35,000 was prepared as a polymer for forming an axial molecule.

The following formulation was prepared;

PEG 10 g

TEMPO (2,2,6,6-tetramethyl-1-piperidinyloxy radical) 100 mg

Sodium bromide 1 g

The components were dissolved in 100 mL of water. To the obtained solution, 5 mL of a commercially available aqueous sodium hypochlorite solution (effective chlorine concentration: 5%) was added and stirred at room temperature for ten minutes. Thereafter, ethanol was added in an amount of up to 5 mL to terminate the reaction. Extraction was performed by using 50 mL of methylene chloride, thereafter methylene chloride was distilled off, the resultant residue was dissolved in 250 mL of ethanol, and reprecipitation was performed at a temperature of −4° C. for 12 hours to collect PEG-COOH, which was then dried.

(1-2) Preparation of Polyrotaxane;

3 g of PEG-COOH prepared above and 12 g of α-cyclodextrin (α-CD) were each dissolved in 50 mL of hot water at 70° C., and the obtained solutions were mixed and thoroughly shaken. Then, the mixed solution was reprecipitated at a temperature of 4° C. for 12 hours, and the precipitated inclusion complex was freeze-dried and collected. Thereafter, 0.13 g of adamantanamine was dissolved in 50 mL of dimethylformamide (DMF) at room temperature, and the above inclusion complex was added and thoroughly mixed by quickly shaking. Subsequently, a solution prepared by dissolving 0.38 g of a BOP reagent (benzotriazol-1-yl-oxy-tris(dimethylamino)phosphonium hexafluorophosphate) in DMF was further added and thoroughly mixed by shaking. Further, a solution prepared by dissolving 0.14 mL of diisopropylethylamine in DMF was added and thoroughly mixed by shaking, to give a slurry reagent.

The slurry reagent obtained above was left to stand at 4° C. for 12 hours. Thereafter, 50 mL of a DMF/methanol mixed solvent (volume ratio: 1/1) was added, mixed, and centrifuged, and the supernatant was thrown away. Further, cleaning with the use of the above DMF/methanol mixed solution was performed and thereafter cleaning with the use of methanol and centrifugation were performed, to give a precipitate. The obtained precipitate was vacuum-dried and thereafter dissolved in 50 mL of DMSO, and the obtained transparent solution was added dropwise to 700 mL of water to allow polyrotaxane to precipitate. The precipitated polyrotaxane was collected by centrifugation and was vacuum-dried. The dried polyrotaxane was further dissolved in DMSO, precipitation was performed in water, and the obtained precipitate was collected and dried, to give a purified polyrotaxane. The threaded amount of α-CD was 0.25.

Here, polyrotaxane was dissolved in DMSO-$d_6$ and the obtained solution was subjected to measurement with a $^1$H-NMR measuring instrument (JNM-LA500 produced by JEOL Ltd.). The threaded amount was calculated by the method below.

Here, X, Y and X/(Y–X) mean as follows.
X: integrated value of protons derived from the hydroxyl groups of cyclodextrin at a concentration of 4 to 6 ppm
Y: integrated value of protons derived from cyclodextrin and the methylene chains of PEG at a concentration of 3 to 4 ppm
X/(Y–X): ratio of protons derived from cyclodextrin to protons derived from PEG
First, X/(Y–X) when the maximum threadable amount was regarded as 1 was theoretically calculated and the thus-obtained value was compared with X/(Y–X) calculated from the actual analysis value of a compound, and thereby the threaded amount was calculated.

(1-3) Introduction of Side Chains into Polyrotaxane;
500 mg of the polyrotaxane purified above was dissolved in 50 mL of a 1 mol/L aqueous NaOH solution, and 3.83 g (66 mmol) of propylene oxide was added and stirred in an argon atmosphere at room temperature for 12 hours. Then, the polyrotaxane solution was neutralized so as to have a pH value of 7 to 8 with the use of a 1 mol/L aqueous HCl solution, and the neutralized polyrotaxane solution was dialyzed with a dialysis tube and thereafter freeze-dried, to give hydroxypropylated polyrotaxane. The thus-obtained hydroxylpropylated polyrotaxane was identified by $^1$H-NMR and GPC and was thereby confirmed to be a hydroxylpropylated polyrotaxane having an intended structure.

The degree of modification of OH groups in the cyclic molecules with the hydroxypropyl groups was 0.5, and the weight average molecular weight Mw measured by GPC measurement was 180,000.

5 g of the obtained hydroxypropylated polyrotaxane was dissolved in 22.5 g of ε-caprolactone at 80° C., to give a mixed solution. The mixed solution was stirred at 110° C. for one hour while dry nitrogen was blown, and 0.16 g of a 50 wt % xylene solution of tin (II) 2-ethylhexanoate was added and stirred at 130° C. for six hours. Thereafter, xylene was added to give a side chain-introduced polycaprolactone-modified polyrotaxane xylene solution having a nonvolatile concentration of approximately 35% by mass.

(1-4) Preparation of OH Group-Introduced Side Chain-Modified Polyrotaxane (Corresponding to (a1) Polyrotaxane Compound (this Compound May Hereinafter be Simply Called (a1));

The polycaprolactone-modified polyrotaxane xylene solution prepared above was added dropwise to hexane and the reaction product was collected and dried, to give a side chain-modified polyrotaxane (a1) having side chains terminated with OH groups. The physical properties of this polyrotaxane (a1) were as described below.

Degree of side-chain modification: 0.5 (by percentage, 50%)
Molecular weight of side chains: approximately 500 on average Weight average molecular weight Mw (GPC) of polyrotaxane: 700,000

Example 1

(2-1) Preparation of Acrylate Group-Introduced Side Chain-Modified Polyrotaxane Monomer (a1) (This Monomer May Hereinafter be Simply Called (a1).)

The polycaprolactone-modified polyrotaxane (a1) prepared in the above preparation example (1-4) was used. 10.0 g of the polycaprolactone-modified polyrotaxane (a1) was dissolved in 50 mL of methyl ethyl ketone, 5 mg of dibutylhydroxy toluene (polymerization inhibitor) was added thereto, and 1.94 g of 2-acryloyloxyethyl isocyanate was thereafter added dropwise. 10 mg of dibutyltin dilaurate was added as a catalyst, and the resultant mixture was stirred at 70° C. for four hours, to give a methyl ethyl ketone solution of polyrotaxane in which acrylate groups were introduced into polycaprolactone ends. The thus-obtained solution was added dropwise to hexane, precipitated solids were collected and dried, to give a polyrotaxane monomer (A1) in which acrylate groups as radical-polymerizable groups were introduced into side chains.

The physical properties of the acrylate group-introduced side chain-modified polyrotaxane monomer (A1) were as described below.

Molecular weight of side chains: approximately 600 on average Weight average molecular weight Mw (GPC) of polyrotaxane monomer: 880,000
Ratio of modification with acrylate groups: 85 mol %
Ratio of remaining OH groups: 15 mol %
The properties of the obtained (A1) polyrotaxane monomer are summarized in Table 1. For reference, the properties of the above-mentioned (a1) polyrotaxane compound are also shown.

The proton nuclear magnetic resonance spectrum of (A1) was measured with a $^1$H-NMR measuring instrument (JNM-LA500 produced by JEOL Ltd.) and the following characteristic peaks were observed: a peak derived from methylene groups neighboring carbonyl carbons in a polycaprolactone structure at around 52.3 ppm, a peak derived from methylene groups neighboring nitrogen atoms of urethane groups and a peak derived from methylene groups neighboring oxygen atoms in a polycaprolactone structure at around 53.5 ppm, a peak derived from methylene groups neighboring oxygen atoms of a polycaprolactone structure at around 54.0 ppm, a peak derived from methylene groups bonding to acryloyl groups at around 54.2 ppm, and three peaks derived from acryloyl groups at around 55.8 to 6.5 ppm.

Example 2

(2-2) Preparation of Acrylate Group-Introduced Side Chain-Modified Polyrotaxane Monomer (A2) (This Monomer May Hereinafter be Simply Called (A2).)

A polycaprolactone-modified polyrotaxane (a2) was prepared by the same process as described in Preparation Examples (1-1) to (1-4) except that a linear polyethylene glycol having a molecular weight of 11,000 was used as a polymer for forming an axial molecule and the amount of ε-caprolactone used to introduce side chains was changed to 15.0 g. The physical properties of the obtained polyrotaxane (a2) were as described below.

Threaded amount of α-CD: 0.25
Degree of side-chain modification: 0.5
Molecular weight of side chains: approximately 400 on average Weight average molecular weight Mw (GPC) of polyrotaxane: 180,000

A polyrotaxane (A2) in which acrylate groups as polymerizable functional groups were introduced into side chains was obtained by preparing it in the same manner as described in (2-1) of Example 1 except that 10.0 g of the thus-obtained polycaprolactone-modified polyrotaxane (a2) and 0.83 g of 2-acryloyloxyethyl isocyanate were used.

The physical properties of the thus-obtained acrylate group-introduced side chain-modified polyrotaxane monomer (A2) were as described below.
Weight average molecular weight Mw (GPC) of polyrotaxane monomer: 190,000
Ratio of modification with acrylate groups: 35 mol %
Ratio of remaining OH groups: 65 mol %
The properties of the obtained (A2) polyrotaxane monomer are summarized in Table 1. The properties of the (a2) polyrotaxane compound are also shown as Comparative Example 1.

The proton nuclear magnetic resonance spectrum of (A2) was measured with a $^1$H-NMR measuring instrument (JNM-LA500 produced by JEOL Ltd.) and as with the (A1) polyrotaxane monomer of Example 1, characteristic peaks were observed at around δ2.3 ppm, around δ3.5 ppm, around δ4.0 ppm, around δ4.2 ppm, and around δ5.8 to 6.5 ppm.

Example 3

(2-3) Preparation of Methacrylic Group-Introduced Side Chain-Modified Polyrotaxane Monomer (A3) (This Monomer May Hereinafter be Simply Called (A3).)

A polyrotaxane monomer (A3) in which methacrylate groups as polymerizable functional groups were introduced into side chains was obtained by preparing it by the same process as described in (2-1) of Example 1 except that 10.0 g of the polycaprolactone-modified polyrotaxane (a2) prepared in Example 2 and 1.85 g of 2-methacryloyloxy ethyl isocyanate were used.

The physical properties of the methacrylate group-introduced side chain-modified polyrotaxane monomer (A3) were as described below.
Weight average molecular weight Mw (GPC) of polyrotaxane monomer: 200,000
Ratio of modification with methacrylate groups: 81 mol %
Ratio of remaining OH groups: 19 mol %
The properties of the obtained (A3) polyrotaxane monomer are summarized in Table 1.

The proton nuclear magnetic resonance spectrum of (A3) was measured with a $^1$H-NMR measuring instrument (JNM-LA500 produced by JEOL Ltd.) and as with the (A1) polyrotaxane monomer of Example 1, characteristic peaks were observed at around δ2.3 ppm, around δ3.5 ppm, around δ4.0 ppm, around δ4.2 ppm, and around δ5.8 to 6.5 ppm.

Example 4

(2-4) Preparation of Acrylic Group and Butyl Group-Introduced Side Chain-Modified Polyrotaxane (A4) (This Monomer May Hereinafter be Simply Called (A4).)

A polyrotaxane monomer (A4) in which acrylic groups as polymerizable functional groups and butyl groups as groups not containing polymerizable functional groups were introduced into side chains was obtained by preparing it in the same manner as described in (2-1) of Example 1 except that 10.0 g of the polycaprolactone-modified polyrotaxane (a2) prepared in Example 2 was used and 0.83 g of 2-acryloyloxyethyl isocyanate and 0.75 g of n-butyl isocyanate were used.

The physical properties of the side chain-modified polyrotaxane monomer (A4) were as described below.
Weight average molecular weight Mw (GPC) of polyrotaxane monomer: 200,000
Ratio of modification with acrylate groups: 35 mol %
Ratio of modification with butyl groups: 45 mol %
Ratio of remaining OH groups: 20 mol %
The properties of the obtained (A4) polyrotaxane monomer are summarized in Table 1.

The proton nuclear magnetic resonance spectrum of (A4) was measured with a $^1$H-NMR measuring instrument (JNM-LA500 produced by JEOL Ltd.) and as with the (A1) polyrotaxane monomer of Example 1, characteristic peaks were observed at around δ2.3 ppm, around δ3.5 ppm, around δ4.0 ppm, around δ4.2 ppm, and around δ5.8 to 6.5 ppm. In addition, a peak derived from methylene groups neighboring nitrogen atoms of urethane groups formed by the reaction of an n-butyl isocyanate group was observed at around δ3.0 ppm.

Comparative Example 1

The polycaprolactone-modified polyrotaxane (a2) prepared in Example 2 was used as the polycaprolactone-modified polyrotaxane (a2) in Comparative Example 1.

Since the polycaprolactone-modified polyrotaxane (a2) is not modified with a compound having a radical-polymerizable group, it corresponds to the polyrotaxane compound described in the present specification.

The properties of the polycaprolactone-modified polyrotaxane (a2) are summarized in Table 1.

Comparative Example 2

A polyrotaxane monomer (a3) in which acrylic groups as polymerizable functional groups were introduced into side chains was obtained by preparing it in the same manner as described in (2-1) of Example 1 except that 10.0 g of the polycaprolactone-modified polyrotaxane (a2) prepared in Example 2 and 2.60 g of 2-acryloyloxyethyl isocyanate were used.

The physical properties of the acrylic group-introduced side chain-modified polyrotaxane monomer (a3) were as described below.

The properties of the polyrotaxane monomer (a3) are summarized in Table 1.

TABLE 1

|  | (A) Polyrotaxane Monomers | Molecular Weight of Axis | Cyclic Molecule | Number of Threaded Cyclic Molecules | Degree of Modification in Cyclic Molecule | Molecular Weight of Side Chain | Weight Average Molecular Weight |
|---|---|---|---|---|---|---|---|
| Reference | a1 | 35,000 | α-cyclodextrin | 0.25 | 0.5 | 500 | 700,000 |
| Example 1 | A1 | 35,000 | α-cyclodextrin | 0.25 | 0.5 | 600 | 880,000 |
| Example 2 | A2 | 11,000 | α-cyclodextrin | 0.25 | 0.5 | 400 | 190,000 |
| Example 3 | A3 | 11,000 | α-cyclodextrin | 0.25 | 0.5 | 500 | 200,000 |
| Example 4 | A4 | 11,000 | α-cyclodextrin | 0.25 | 0.5 | 500 | 200,000 |
| Comparative Example 1 | a2 | 11,000 | α-cyclodextrin | 0.25 | 0.5 | 400 | 180,000 |
| Comparative Example 2 | a3 | 11,000 | α-cyclodextrin | 0.25 | 0.5 | 500 | 200,000 |

|  | Polymerizable groups | Non-polymerizable groups | Ratio (mol %) |
|---|---|---|---|
| Reference | none | none | 0% |
| Example 1 | acrylate | none | 85% |
| Example 2 | acrylate | none | 35% |
| Example 3 | methacrylate | none | 81% |
| Example 4 | acrylate | butyl | 35% (acryl) 45% (butyl) |
| Comparative Example 1 | none | none | 0% |
| Comparative Example 2 | acrylate | none | 100% |

Example 5

Preparation of Photochromic Curable Composition (Z1) (this Composition May Hereinafter be Simply Called (Z1)), and Preparation and Evaluation of Photochromic Cured Bodies (Preparation of Photochromic Curable Composition (Z1))

Components according to the formulation below were thoroughly mixed to prepare a photochromic curable composition (Z1).
Formulation;

(A) component; polyrotaxane monomer: (A1; prepared in Example 1) 5 parts by mass
(B) component; photochromic compound: a compound represented by the following formula 2 parts by mass

[Chem. 10]

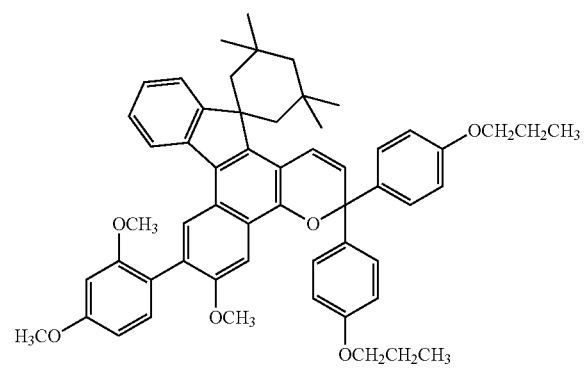

(C) Polymerizable Monomer
(C1-1) Component;
Polyethylene glycol dimethacrylate (average molecular weight: 736) 45 parts by mass
(C1-1) Component;
Polyethylene glycol dimethacrylate (average molecular weight: 536) 7 parts by mass
(C2-1) Component
Trimethylolpropane trimethacrylate 40 parts by mass
(C3) Components
γ-Methacryloyloxypropyltrimethoxysilane 2 parts by mass
Glycidyl methacrylate 1 part by mass Other compounding agents (additives): Bis(1,2,2,6,6-pentamethyl-4-piperidyl)sebacate (molecular weight: 508) (stabilizer) 3 parts by mass Ethylenebis(oxyethylene)bis[3-(5-tert-butyl-4-hydroxy-m-tolyl)propionate] (Irganox 245, produced by Ciba Specialty Chemicals Co., Ltd.) (stabilizer) 3 parts by mass Phenylbis(2,4,6-trimethylbenzoyl)-phosphine oxide (product name: Irgacure 819, produced by BASF) (polymerization initiator) 0.3 parts by mass
Product name; L7001 (leveling agent), produced by Dow Corning Toray Co., Ltd. 0.1 parts by mass.

(Preparation and Evaluation of Photochromic Laminate (Photochromic Cured Body))

A photochromic laminate was obtained with the use of the photochromic curable composition (Z1) by a lamination method. The polymerization process is as described below.

First, a thiourethane-based plastic lens having a center thickness of 2 mm and a refractive index of 1.60 was prepared as an optical substrate. The thiourethane-based plastic lens was previously alkali-etched with the use of an aqueous 10% sodium hydroxide solution at 50° C. for 5 minutes and was thereafter sufficiently cleaned with distilled water.

A moisture-curable primer (product name; TR-SC-P, produced by Tokuyama Corp.) was applied onto a surface of the above plastic lens with the use of a spin coater (1H-DX2, produced by MIKASA Co. Ltd.) at a velocity of 70 rpm for 15 seconds and subsequently at 1,000 rpm for 10 seconds. Thereafter approximately 2 g of the photochromic composition obtained above was applied by spin coating at a velocity of 60 rpm for 40 seconds, and subsequently at 600 rpm for 10 to 20 seconds such that the film thickness of the photochromic coating layer was 40 μm.

The lens with a surface to which the coating agent was applied as described above was irradiated with light in a nitrogen gas atmosphere by using a metal halide lamp with an output of 200 mW/cm$^2$ for 90 seconds, and thereby the coating film was cured. Then, the lens was further heated at 110° C. for one hour, to give a photochromic laminate having a photochromic layer.

The obtained photochromic laminate had photochromic properties including a maximum absorption wavelength of 582 nm, a color optical density of 0.88, and a fading speed of 42 seconds. These photochromic properties were evaluated as described below.

The obtained photochromic laminate as a sample was irradiated with light from a xenon lamp L-2480 (300 W) SHL-100 produced by Hamamatsu Photonics K.K. through an aero-mass filter (produced by Corning Incorporated) at 20±1° C. with a beam intensity on the polymer surface (photochromic coating layer) of 365 nm=2.4 mW/cm$^2$, 245 nm=24 ρW/cm$^2$ for 120 seconds to develop a color, and the photochromic properties of the photochromic laminate were determined. The photochromic properties and the film properties such as Vickers hardness were evaluated by the methods below. The properties are summarized in Table 2.

Maximum Absorption Wavelength (λmax):

Maximum absorption wavelength after color development obtained with a spectrophotometer (instantaneous multi-channel photodetector MCPD1000) produced by Otsuka Electronics Co., Ltd. The maximum absorption wavelength affects the color tone at the time of color development.

Color Optical Density {ε(120)–ε(0)}:

Difference between the absorbance {ε(120)} after light irradiation for 120 seconds at the above maximum absorption wavelength and the absorbance ε(0) before the light irradiation. It can be assumed that the larger the value is, the more excellent the photochromic properties are.

Fading speed [t½ (sec.)]:

Time until the absorbance at the above maximum absorption wavelength of the sample decreases to ½ of {ε(120)–ε(0)} when light irradiation is performed for 120 seconds and thereafter stopped. It can be assumed that the shorter the time is, the more excellent the photochromic properties are.

Vickers Hardness

Vickers hardness was measured with the use of a hardness tester with automatic measuring (reading) device (PMT-X7A, produced by Matsuzawa Co., Ltd.). Specifically, a Vickers indenter was pressed into a surface of a sample at 10 gf for seconds and the Vickers hardness was obtained from the indentation. The Vickers hardness is an index used for determining whether a scratch is caused during a lens-working process. As a criterion, when a Vickers hardness exceeds 4.5, scratches are barely caused and when a Vickers hardness is 4.5 or lower, scratches are easily caused.

Cloudiness

Under crossed nicols, a molded photochromic laminate was visually observed to evaluate the degree of cloudiness.
1: Cloudiness is not observed or barely observed, causing no problem as a product
2: Cloudiness is slightly observed, causing no problem as a product
3: Cloudiness greater than the cloudiness 2 is observed, causing no problem as a product
4. Cloudiness is observed and the molded photochromic laminate cannot be used as a product.

Crack Ratio

The ratio of photochromic laminates (photochromic cured bodies) causing cracks during the molding thereof was calculated. The crack occurrence ratio (%) was evaluated which is a ratio of the number of photochromic laminates causing cracks to the 20 sheets of produced photochromic laminates. The results are summarized in Table 2.

Example 6

Preparation of Photochromic Curable Composition (Z2) (This Composition May Hereinafter be Simply Called (Z2))

A photochromic curable composition (Z2) was prepared in the same manner as described in Example 5 except that the polyrotaxane monomer (A2) obtained in Example 2 was used.

(Preparation and Evaluation of Photochromic Laminate)

A photochromic laminate was obtained by a lamination method in the same manner as described in Example 5 except that the photochromic curable composition (Z2) was used, and the photochromic laminate was evaluated. The results are summarized in Table 2.

Example 7

Preparation of Photochromic Curable Composition (Z3) (this Composition May Hereinafter be Simply Called (Z3))

A photochromic curable composition (Z3) was prepared in the same manner as described in Example 5 except that the polyrotaxane monomer (A3) obtained in Example 3 was used.

(Preparation and Evaluation of Photochromic Laminate)

A photochromic laminate was obtained by a lamination method in the same manner as described in Example 5 except that the photochromic curable composition (Z3) was used, and the photochromic laminate was evaluated. The results are summarized in Table 2.

Example 8

Preparation of Photochromic Curable Composition (Z4) (This Composition May Hereinafter be Simply Called (Z4))

A photochromic curable composition (Z4) was prepared in the same manner as described in Example 5 except that the polyrotaxane monomer (A4) obtained in Example 4 was used.

(Preparation and Evaluation of Photochromic Laminate)

A photochromic laminate was obtained by a lamination method in the same manner as described in Example 5 except that the photochromic curable composition (Z4), and the photochromic laminate was evaluated. The results are summarized in Table 2.

Comparative Example 3

A photochromic curable composition (z1) was prepared in the same manner as described in Example 5 except that the polycaprolactone-modified polyrotaxane (a2) (cf. Comparative Example 1) prepared in Example 2 was directly used, and then, a photochromic laminate was obtained by a lamination method in the same manner as described in Example 5 and was evaluated. The results are summarized in Table 2.

Comparative Example 4

A photochromic curable composition (z2) was prepared in the same manner as described in Example 5 except that the polyrotaxane monomer (a3) prepared in Comparative Example 2 was used, and a photochromic laminate was obtained by a lamination method in the same manner as described in Example 5 and was evaluated. The results are summarized in Table 2.

TABLE 2

|  | (A) Polyrotaxane Monomers | Photochromic Curable Compositions | Color Optical Density | Fading Speed | Vickers Hardness | Cloudiness Evaluation | Crack Ratio |
|---|---|---|---|---|---|---|---|
| Example 5 | A1 | Z1 | 0.88 | 47 sec | 5.5 | 3 | 10% |
| Example 6 | A2 | Z2 | 0.90 | 45 sec | 5.2 | 2 | 5% |
| Example 7 | A3 | Z3 | 0.86 | 49 sec | 5.6 | 1 | 5% |
| Example 8 | A4 | Z4 | 0.91 | 43 sec | 5.4 | 1 | 0% |
| Comparative Example 3 | a2 | z1 | 0.92 | 42 sec | 4.8 | 4 | 10% |
| Comparative Example 4 | a3 | z2 | 0.87 | 47 sec | 5.5 | 1 | 25% |

As is evident from the above examples and comparative examples, photochromic laminates obtained by polymerizing the photochromic curable composition of the present invention are characterized by their significantly excellent photochromic properties, high hardness, reduced cloudiness, and further low crack occurrence ratio.

Examples 5 to 8 have excellent photochromic properties and exhibit reduced cloudiness compared with Comparative Example 3 and low crack occurrence ratio compared with Comparative Example 4.

Example 9 to Example 14

(A) Preparation of Polyrotaxane Monomers

In Example 9, an (A) polyrotaxane monomer (this monomer may hereinafter be simply called (A5)) was prepared by performing the same operation as described in Example 1 except that a linear polyethylene glycol having a molecular weight of 20,000 was used as a polymer for forming an axial molecule and using ε-caprolactone and 2-acyloyloxyethyl isocyanate were used such that the ratio of modification with acrylate groups (mol %) was 77%, the molecular weight of side chains modified with acrylate groups was approximately 500, and the weight-average molecular weight was 610,000.

In Example 10, an (A) polyrotaxane monomer (this monomer may hereinafter be simply called (A6)) was prepared by performing the same operation as described in Example 1 except that a linear polyethylene glycol having a molecular weight of 20,000 was used as a polymer for forming an axial molecule and ε-caprolactone and 2-acyloyloxyethyl isocyanate were used such that the ratio of modification with acrylate groups (mol %) was 90%, the molecular weight of side chains modified with acrylate groups was approximately 500, and the weight-average molecular weight was 630,000.

In Example 11, an (A) polyrotaxane monomer (this monomer may hereinafter be simply called (A7)) was prepared by performing the same operation as described in Example 1 except that a linear polyethylene glycol having a molecular weight of 11,000 was used as a polymer for forming an axial molecule and ε-caprolactone and 2-acyloyloxyethyl isocyanate were used such that the ratio of modification with acrylate groups (mol %) was 85%, the molecular weight of side chains modified with acrylate groups was approximately 300, and the weight-average molecular weight was 180,000.

In Example 12, an (A) polyrotaxane monomer (this monomer may hereinafter be simply called (A8)) was prepared by performing the same operation as described in Example 1 except that a linear polyethylene glycol having a molecular weight of 11,000 was used as a polymer for forming an axial molecule and ε-caprolactone and 2-methacyloyloxyethyl isocyanate were used such that the ratio of modification with methacrylate groups (mol %) was 85%, the molecular weight of side chains modified with methacrylate groups was approximately 300, and the weight-average molecular weight was 180,000.

In Example 13, an (A) polyrotaxane monomer (this monomer may hereinafter be simply called (A9)) was prepared by performing the same operation as described in Example 1 except that a linear polyethylene glycol having a molecular weight of 11,000 was used as a polymer for forming an axial molecule and ε-caprolactone and 2-acyloyloxyethyl isocyanate were used such that the ratio of modification with acrylate groups (mol %) was 87%, the molecular weight of side chains modified with acrylate groups was approximately 400, and the weight-average molecular weight was 190,000.

In Example 14, an (A) polyrotaxane monomer (this monomer may hereinafter be simply called (A10)) was prepared by performing the same operation as described in Example 1 except that a linear polyethylene glycol having a molecular weight of 11,000 was used as a polymer for forming an axial molecule and ε-caprolactone and 2-acyloyloxyethyl isocyanate were used such that the ratio of modification with acrylate groups (mol %) was 86%, the molecular weight of side chains modified with acrylate groups was approximately 600, and the weight-average molecular weight was 220,000.

Properties of the (A) polyrotaxane monomers prepared in Examples 9 to 14 are summarized in Table 3.

TABLE 3

|  | (A) Polyrotaxane Monomers | Molecular Weight of Axis | Cyclic molecule | Number of threaded cyclic molecules | Degree of Modification in Cyclic Molecule | Molecular Weight of Side Chain | Weight Average Molecular Weight |
|---|---|---|---|---|---|---|---|
| Example 9 | A5 | 20,000 | α-cyclodextrin | 0.25 | 0.5 | 500 | 610,000 |
| Example 10 | A6 | 20,000 | α-cyclodextrin | 0.25 | 0.5 | 500 | 630,000 |
| Example 11 | A7 | 11,000 | α-cyclodextrin | 0.25 | 0.5 | 300 | 180,000 |
| Example 12 | A8 | 11,000 | α-cyclodextrin | 0.25 | 0.5 | 300 | 180,000 |
| Example 13 | A9 | 11,000 | α-cyclodextrin | 0.25 | 0.5 | 400 | 190,000 |
| Example 14 | A10 | 11,000 | α-cyclodextrin | 0.25 | 0.5 | 600 | 220,000 |

|  | Polymerizable groups | Non-polymerizable groups | Modification Ratio (mol %) |
|---|---|---|---|
| Example 9 | acrylate | none | 77% |
| Example 10 | acrylate | none | 90% |
| Example 11 | acrylate | none | 85% |

TABLE 3-continued

| | | | |
|---|---|---|---|
| Example 12 | methacrylate | none | 85% |
| Example 13 | acrylate | none | 87% |
| Example 14 | acrylate | none | 86% |

Example 15 to Example 27

Preparation of photochromic curable compositions (Z5) to (Z17) and production and evaluation of photochromic cured bodies The components below were mixed in the compounding ratios shown in Table 4 to prepare photochromic curable compositions (Z5) to (Z17).

The photochromic curable compositions obtained in Examples 15 to 27 are referred to as photochromic curable compositions (Z5) to (Z17), respectively.

Photochromic cured bodies were produced from the obtained photochromic curable compositions (Z5) to (Z17) by performing the same operation as described in Example 5 and were evaluated in the same manner as described in Example 5. The results are summarized in Table 5. Compounding ratios applied to the photochromic curable compositions (Z1) to (Z4) in Examples 5 to 8 are also shown in Table 4.

Components used for preparing the photochromic curable compositions are as follows.

(A) Polyrotaxane Monomer

The polyrotaxane monomers prepared in Examples 1 to 4 are referred to as A1 to A4, respectively, and the polyrotaxane monomers prepared in Examples 9 to 14 are referred to as A5 to A10, respectively.

(B) Photochromic Compound

The photochromic compound used in Example 5 was used.

(C) Polymerizable Monomers; the Polymerizable Monomers are Represented by the Following Abbreviations.

(C1) Component (Bifunctional (Meth)Acrylate Monomers)

(C1-1) Component

Polyethylene glycol dimethacrylate (average molecular weight: 536); PEDM-1

Polyethylene glycol dimethacrylate (average molecular weight: 736); PEDM-2

Polyethylene glycol diacrylate (average molecular weight: 708); PEDA-1

(C1-3) Component

Reaction product between polycarbonate diol and acrylic acid (average molecular weight: 520); PCA (C1-4) Component EB4858 (molecular weight: 454) produced by Daicel-UCB Co., Ltd.; EB4858

(C2) Component (Polyfunctional (Meth)Acrylate Monomers Having Three or More (Meth)Acrylate Groups in a Molecule)

(C2-1) Component

Trimethylolpropane trimethacrylate; TMPT

Tetramethylolmethane tetraacrylate; TMMT (C3) Component (Monofunctional (Meth)Acrylate Monomers)

γ-Methacryloyloxypropyltrimethoxysilane; MOPMS

Glycidyl methacrylate; GM

Methoxypolyethyleneglycol methacrylate (average molecular weight: 468); MPEM

TABLE 4

| | Curable Compositions | (A) Polyrotaxane Monomers (parts by mass) | (B) Photochromic Compound (parts by mass) | (C) component | | |
|---|---|---|---|---|---|---|
| | | | | (C1) component (parts by mass) | (C2) component (parts by mass) | (C3) component (parts by mass) |
| Example 5 | Z1 | A1<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 6 | Z2 | A2<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 7 | Z3 | A3<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 8 | Z4 | A4<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 15 | Z5 | A5<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 16 | Z6 | A6<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 17 | Z7 | A7<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 18 | Z8 | A8<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |
| Example 19 | Z9 | A9<br>5 parts by mass | 2 parts by mass | PEDM-2; 45 parts by mass<br>PEDM-1; 7 parts by mass | TMPT; 40 parts by mass | MOPMS; 2 parts by mass<br>GM; 1 part by mass |

TABLE 4-continued

| Curable Compositions | (A) Polyrotaxane Monomers (parts by mass) | (B) Photochromic Compound (parts by mass) | (C1) component (parts by mass) | (C2) component (parts by mass) | (C3) component (parts by mass) |
|---|---|---|---|---|---|
| Example 20 | Z10 | A10 5 parts by mass | 2 parts by mass | PEDM-2; 45 parts by mass PEDM-1; 7 parts by mass | TMPT; 40 parts by mass | MOPMS; 2 parts by mass GM; 1 part by mass |
| Example 21 | Z11 | A9 3 parts by mass | 2 parts by mass | PEDM-2; 64 parts by mass | TMPT; 30 parts by mass | MOPMS; 2 parts by mass GM; 1 part by mass |
| Example 22 | Z12 | A9 3 parts by mass | 2 parts by mass | PEDM-2; 47 parts by mass PEDA-1; 27 parts by mass | TMPT; 20 parts by mass | MOPMS; 2 parts by mass GM; 1 part by mass |
| Example 23 | Z13 | A9 3 parts by mass | 2 parts by mass | PEDM-2; 47 parts by mass EB4858; 17 parts by mass | TMPT; 30 parts by mass | MOPMS; 2 parts by mass GM; 1 part by mass |
| Example 24 | Z14 | A9 3 parts by mass | 2 parts by mass | PEDM-2; 44 parts by mass | TMPT; 50 parts by mass | MOPMS; 2 parts by mass GM; 1 part by mass |
| Example 25 | Z15 | A9 3 parts by mass | 2 parts by mass | PEDA-1; 49 parts by mass | TMPT; 40 parts by mass | MOPMS; 2 parts by mass GM; 1 part by mass MPEM; 5 parts by mass |
| Example 26 | Z16 | A9 3 parts by mass | 2 parts by mass | PEDM-2; 42 parts by mass PCA; 12 parts by mass | TMPT; 40 parts by mass | MOPMS; 2 parts by mass GM; 1 part by mass |
| Example 27 | Z17 | A9 3 parts by mass | 2 parts by mass | PEDA-1; 54 parts by mass | TMMT; 40 pats by mass | MOPMS; 2 parts by mass GM; 1 part by mass |

TABLE 5

| | (A) polyrotaxane monomers | Photochromic curable compositions | Color optical density | Fading speed | Vickers hardness | Cloudiness evaluation | Crack ratio |
|---|---|---|---|---|---|---|---|
| Example 15 | A5 | Z5 | 0.87 | 48 | 5.4 | 1 | 5% |
| Example 16 | A6 | Z6 | 0.87 | 48 | 5.4 | 1 | 5% |
| Example 17 | A7 | Z7 | 0.88 | 47 | 5.3 | 1 | 0% |
| Example 18 | A8 | Z8 | 0.86 | 50 | 5.6 | 1 | 5% |
| Example 19 | A9 | Z9 | 0.87 | 47 | 5.4 | 1 | 5% |
| Example 20 | A10 | Z10 | 0.87 | 48 | 5.5 | 1 | 5% |
| Example 21 | A9 | Z11 | 0.93 | 41 | 4.3 | 1 | 0% |
| Example 22 | A9 | Z12 | 0.94 | 39 | 3.8 | 1 | 5% |
| Example 23 | A9 | Z13 | 0.85 | 50 | 6.2 | 1 | 0% |
| Example 24 | A9 | Z14 | 0.82 | 58 | 7.9 | 1 | 15% |
| Example 25 | A9 | Z15 | 0.90 | 44 | 4.9 | 1 | 10% |
| Example 26 | A9 | Z16 | 0.88 | 48 | 6.1 | 1 | 0% |
| Example 27 | A9 | Z17 | 0.89 | 44 | 4.4 | 1 | 0% |

DESCRIPTION OF REFERENCE NUMERALS

1: polyrotaxane
2: axial molecule
3: cyclic molecule
4: bulky end group
5: side chain

The invention claimed is:

1. A photochromic curable composition comprising:
(A) a polyrotaxane monomer wherein, in a polyrotaxane compound having a composite molecular structure composed of an axial molecule and a plurality of cyclic molecules threaded onto the axial molecule, and side chains having OH groups introduced into the cyclic molecules, OH groups in the side chains are modified with a compound having a radical-polymerizable group;
wherein
77 mol % to 90 mol % of the OH groups in the side chains are modified with a compound having a radical-polymerizable group;
(B) a photochromic compound; and
(C) a polymerizable monomer other than the (A) polyrotaxane monomer;
wherein the (C) polymerizable monomer comprises
(C1) a bifunctional (meth)acrylate monomer having two (meth)acrylate groups in its molecule is 30 to 80% by mass;
(C2) a polyfunctional (meth)acrylate monomer having three or more (meth)acrylate groups in its molecule is 10 to 50% by mass; and
(C3) a monofunctional (meth)acrylate monomer having a single (meth)acrylate group is 0 to 20% by mass,
when the total of the (C) polymerizable monomer other than the (A) polyrotaxane monomer is regarded as 100% by mass.

2. The photochromic curable composition according to claim 1, wherein the radical-polymerizable group in the (A) polyrotaxane monomer is a (meth)acrylate group.

3. The photochromic curable composition according to claim 1, wherein the cyclic molecules in the (A) polyrotaxane monomer are cyclodextrin rings.

4. The photochromic curable composition according to claim 1, wherein in the (A) polyrotaxane monomer, the axial molecule threaded through the rings of the cyclic molecules has a chain structure having a bulky group at both ends, the chain structure moiety is composed of polyethylene glycol, and the bulky group at both ends is an adamantyl group.

5. The photochromic curable composition according to claim 1, wherein the side chains having OH groups in the polyrotaxane compound are derived from a lactone-based compound.

6. The photochromic curable composition according to claim 1, comprising 0.0001 to 10 parts by mass of the (B) photochromic compound when the total amount of the (A) polyrotaxane monomer and the (C) polymerizable monomer other than the (A) polyrotaxane monomer is regarded as 100 parts by mass.

7. The photochromic curable composition according to claim 1, comprising 0.1 to 50 parts by mass of the (A) polyrotaxane monomer when the total amount of the (A) polyrotaxane monomer and the (C) polymerizable monomer other than the (A) polyrotaxane monomer is regarded as 100 parts by mass.

8. The photochromic curable composition according to claim 1, wherein in the (A) polyrotaxane monomer, the ratio of modification with a compound not containing a radical-polymerizable group is 0 mol % or more to less than 30 mol %; and the ratio of unmodified OH groups is 0 mol % or more to less than 30 mol %, on the basis of 100 mol % of OH groups in the side chains contained in the polyrotaxane compound.

9. A cured body obtained by curing the photochromic curable composition according to claim 1.

10. A photochromic laminate, wherein the cured body according to claim 9 is laminated on an optical substrate.

* * * * *